US005673247A

United States Patent [19]
Sekimoto et al.

[11] Patent Number: 5,673,247
[45] Date of Patent: Sep. 30, 1997

[54] OPTICAL PICKUP HAVING TWO OBJECTIVE LENSES

[75] Inventors: Yoshihiro Sekimoto, Soraku-gun; Yasuo Nakata, Takaichi-gun; Nobuo Ogata; Tomoyuki Miyake, both of Nara, all of Japan

[73] Assignee: Sharp Kabushiki Kaisha, Osaka, Japan

[21] Appl. No.: 758,010

[22] Filed: Nov. 27, 1996

[30] Foreign Application Priority Data

Nov. 29, 1995 [JP] Japan ................................ 7-311440

[51] Int. Cl.⁶ .................................................... G11B 7/00
[52] U.S. Cl. ........................................... 369/112; 369/110
[58] Field of Search .............................. 369/44.14, 44.19, 369/44.23, 44.32, 53, 54, 58, 93, 110, 112

[56] References Cited

U.S. PATENT DOCUMENTS

| | | | |
|---|---|---|---|
| 4,550,249 | 10/1985 | Damen et al. | 369/112 X |
| 5,097,464 | 3/1992 | Nishiuchi et al. | 369/112 |
| 5,446,565 | 8/1995 | Komma et al. | 369/112 X |
| 5,446,721 | 8/1995 | Sekimoto et al. | 369/247 |

FOREIGN PATENT DOCUMENTS 63-60451 11/1988 Japan.
6-333255 12/1994 Japan.

OTHER PUBLICATIONS

Y. Sekimoto et al., "Development of Optical Pickup for Mini Disk Drives," Optical Review vol. 1, No. 2 (1994) at 174–76.

*Primary Examiner*—P. W. Huber
*Attorney, Agent, or Firm*—David G. Conlin; George W. Neuner

[57] ABSTRACT

An optical pickup for irradiating a first recording medium and a second recording medium with light, at least one of the substrate thickness and the refractive index of the first recording medium being different from that of the second recording medium, where the optical pickup includes: a light source for emitting the light; a polarized beam splitter for receiving the light and for transmitting at least a portion of the light while reflecting the remaining portion of the light depending on the polarization direction of the light; a first objective lens for focusing the portion of the light reflected by the polarized beam splitter onto the first recording medium; and a second objective lens for focusing the portion of the light transmitted through the polarized beam splitter onto the second recording medium.

18 Claims, 19 Drawing Sheets

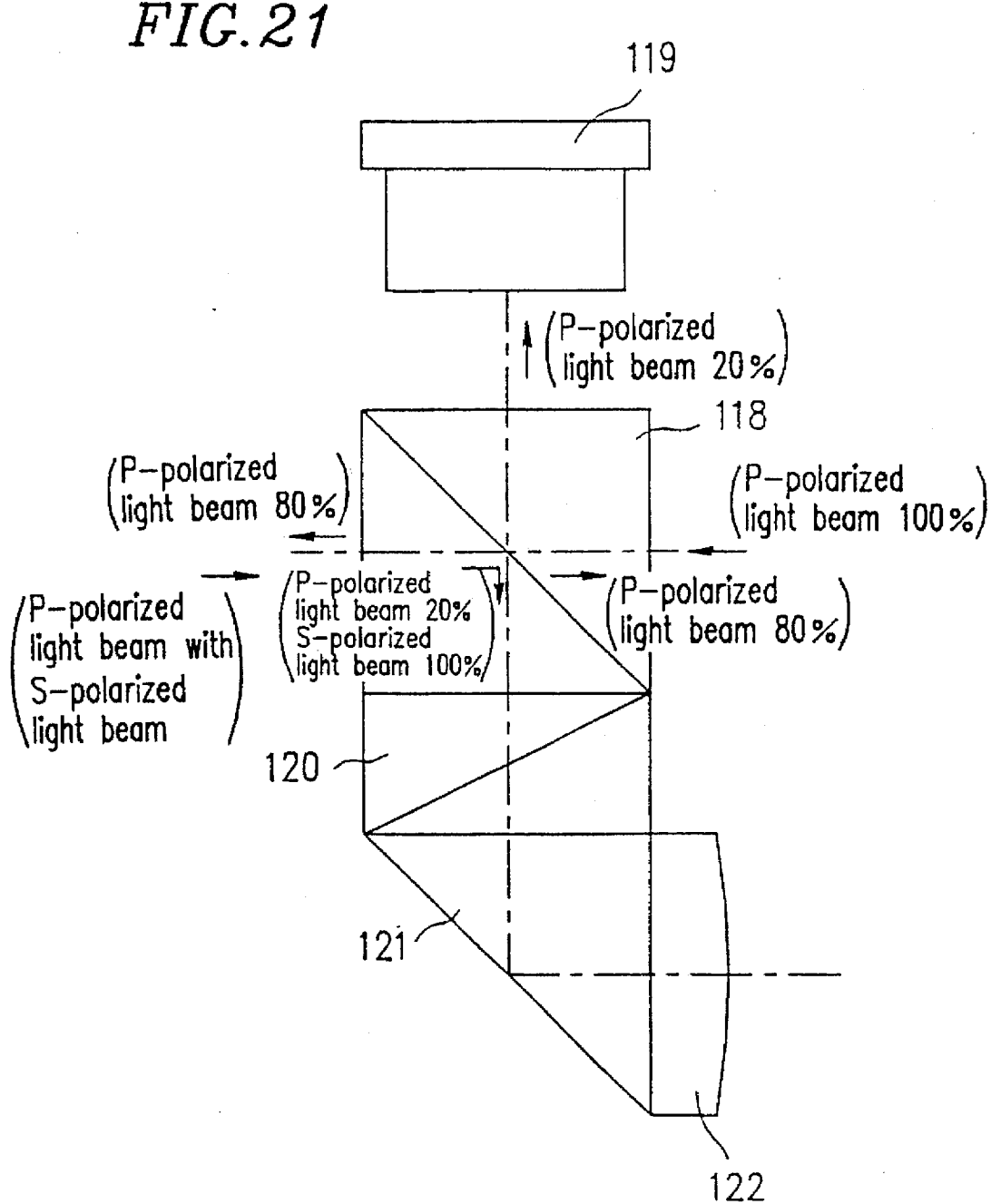

OPTICAL PICKUP HAVING TWO OBJECTIVE LENSES

BACKGROUND OF THE INVENTION

1. Field of the Invention

The present invention relates to an optical pickup in an optical disk apparatus, and in particular to an optical pickup which can be used for different types of optical disks having different substrate thicknesses and the like.

2. Description of the Related Art

In recent years, an optical disk apparatus is widely used as a recording/reproduction apparatus for large-capacity recording media. An optical pickup incorporated in such an optical disk apparatus typically includes: a light source for emitting a light beam; an objective lens for focusing the light beam on an optical recording medium; an optical system for guiding the light beam to the objective lens; and a mechanism for moving the objective lens in a direction perpendicular to the recording surface of the optical disk (hereinafter referred to as the "focusing direction") and in a direction parallel to a radius of the disk (hereinafter referred to as the "tracking direction").

FIG. 20 is an isometric view showing a configuration of a conventional optical pickup particularly used for a magneto-optical recording medium (e.g., a mini disk, or an "MD"). The conventional optical pickup shown in FIG. 20 includes a light source unit 115, having a laser diode or the like, an objective lens 102 for focusing light emitted by the light source unit 115 onto the recording medium and an optical system for guiding the light from the light source unit 115 to the objective lens 102.

In the conventional optical pickup, as shown in FIG. 20, the objective lens 102 is accommodated in a lens holder 103 and can be moved by an objective lens driving device 101 in the focusing direction and/or the tracking direction. A substrate 104 is attached to each side surface of the lens holder 103, onto which an end 108a of each elastic body 108 is secured by solder 109. Four elastic bodies 108 support the lens holder 103 movably with respect to a base 107 in the focusing direction and the tracking direction. Another end 108b of the elastic bodies 108 are also secured by solder 111 onto a substrate 110 which is fixed onto the base 107. Further, the objective lens driving device 101 includes a focusing coil 105 and a tracking coil 106, which are secured in a hole running through a central portion of the lens holder 103, and a permanent magnet 113. The magnet 113 and a yoke (not shown) constitute a magnetic circuit for generating a magnetic field. By making current flowing through at least one of the coils 105 and 106, the lens holder 103 is moved along the magnetic field lines.

Moreover, the objective lens driving device 101 further includes a damper 112 which can suppress the resonance caused by the movement of the lens holder 103 in the focusing direction and/or the tracking direction and a stopper 114.

The lens holder 103 of the optical pickup accommodates a single objective lens 102. A single mirror 116 is provided directly below the objective lens 102 for directing a light beam P emitted by the light source unit 115 to the objective lens 102. In an optical path of the light beam P from the light source unit 115 to the mirror 116, a collimator lens 117, which collimates the light beam P, and a polarized beam splitter 118, which transmits a part of the light beam P and reflects the remaining part thereof depending on the polarization direction. The polarized beam splitter 118 is designed, for example, to have a transmittance of about 80% for a p-polarized light beam and a reflectance of substantially 100% for an s-polarized light beam. The light beam reflected by the polarized beam splitter 118 is incident on a photodetector 119 for generating an electric signal, based on which the output power of the light source unit 115 is monitored, in accordance with the light amount of the incident light beam.

Referring to FIG. 21, the principle of detecting the magneto-optical signals will now be described.

A laser diode of the light source unit 115 emits a linearly polarized light beam P (in this example, a p-polarized light beam). When the light beam P is incident upon the polarized beam splitter 118, about 20% of the light beam P is reflected by the polarized beam splitter to be incident on the photodetector 119, while the remaining portion (about 80%) of the light beam P is transmitted therethrough. The transmitted portion is incident on an optical disk (not shown) via the mirror 116 and the objective lens 102 in that order. In this example, the optical disk is a magneto-optical disk.

The light beam, which is incident on the optical disk, is reflected by an optical disk with the polarization direction thereof being slightly rotated (or inclined) due to the Kerr effect. In other words a small portion of the light beam is altered to an s-polarized component. The rotation angle is determined in accordance with a signal recorded on the position of the optical disk where the light beam is incident. Then, the light beam returns to the polarized beam splitter 118 having a reflectance of about 20% for a p-polarized light beam and a reflectance of substantially 100% for an s-polarized light beam. The light beam is reflected by the polarized beam splitter 118 with the p-polarized component thereof being reduced due to the low reflectance for a p-polarized light beam, while substantially 100% of the s-component thereof is reflected. As a result, the polarization direction of the light beam, which has already been slightly rotated due to the Kerr effect, is further rotated in the same direction. In other words, the Kerr rotation angle of the light beam increases. (In this specification, an angle by which the polarization direction of a light beam is rotated, or inclined is referred to as "the Kerr rotation angle.")

Such a light beam having the increased Kerr rotation angle is incident on a Wollaston prism 120 to be divided into two light beams. The divided light beams from the Wollaston prism 120 are then incident upon a photodetector 124 via a reflection mirror 121 and a spot lens 122. Based on these two light beams, the signal which is recorded on the position of the optical disk where the light beam is incident can be detected.

The p-polarized component of the light beam transmitted through the polarized beam splitter 118 is incident upon the light source unit 115 where it is detected as servo signals including a focusing error signal and a tracking error signal by a photodiode included in the light source unit 115.

There are various types of optical disks available today, e.g., a read-only-type disk such as compact disks (CDs), a write-once-type disk which allows only one write operation, and those which allow repeated write and erase operations such as a magneto-optical-type disk and a phase-change-type disk. In recent years, there have been demands for increasing the information capacity and the information density of these optical disks. To meet these demands, the wavelength of the light beams from the light source should be made shorter and the numerical aperture (NA) of the objective lens should be made larger so as to minimize the diametrical size of the beam spot. When increasing the NA of the objective lens, the substrate of the disk can be made thinner so as to minimize crosstalk and the influence of disk skew on the tracking error signal.

However, the optical pickup shown in FIG. 20 is designed for an optical disk having a certain substrate thickness and a certain refractive index. In particular, optical properties of the objective lens, such as a focal length and the like, are designed considering at least the substrate thickness and the refractive index of the optical disk so as to focus the light beam onto the optical disk in an appropriate manner for the recording, reproducing and/or erasing operation, for example in order to form a light spot having an appropriate size. Therefore, when another optical disk having a different substrate thickness and/or a different refractive index is used, the light beam cannot be focused in an appropriate manner, thereby making the optical pickup inoperative. Accordingly, the conventional optical pickup having the configuration shown in FIG. 20 cannot be used for two types of optical disks different from each other in at least one of the substrate thickness and the refractive index thereof.

In view of such a problem, it has been proposed to provide an optical pickup with two objective lenses as disclosed in Japanese Laid-Open Patent Publication No. 6-333255 (hereinafter referred to as the "first conventional example"). According to the first conventional example, two objective lenses are mounted on a movable section of an objective lens driving device. One of the two objective lenses is selectively used depending on the type of the optical disk to be used. This is realized by a beam-splitting mirror provided below the optical pickup. The beam-splitting mirror has two mirror surfaces corresponding to the two objective lenses. The mirror surface located closer to the light source is a half mirror with the other mirror surface being a reflection mirror. With such a beam-splitting mirror, a light beam from the light source can be made incident upon the two objective lenses.

There has also been a known optical pickup with two objective lenses for detecting magneto-optical signals as disclosed in Japanese Patent Publication No. 63-60451 (hereinafter referred to as the "second conventional example"). According to the second conventional example, a half-wave plate is moved so as to be alternately in and out of the light path, thereby altering the polarization direction of a light beam to be incident upon a polarized beam splitter. The light beam which passes through the polarized beam splitter is used for recording magneto-optical signals on a magneto-optical disk. The magneto-optical signals are detected based on the light beam reflected by the polarized beam splitter.

There is no description in the first conventional example as to detecting magneto-optical signals. The optical disk apparatus of the first conventional example poses a problem when used for a magneto-optical disk. That is, since the example employs the half mirror for splitting a light beam, the Kerr rotation angle is not increased, while a satisfactory C/N ratio cannot be obtained. Moreover such a half mirror greatly reduces the light amount of a light beam since the light beam passes therethrough twice via the incoming/ returning light paths. (In this specification, an "incoming" light beam refers to a light beam travelling from a light source toward an optical disk, whereas a "returning" light beam refers to a light beam returning to the light source after being reflected by the optical disk.)

The second conventional example describes a method for detecting magneto-optical signals, where a half-wave plate is moved alternately in and out of the light path so as to alter the polarization direction of a light beam. Due the such a configuration, the loss of light is eliminated. However, the two divided light beams are both used for a certain type of magneto-optical disk, and cannot be used for other types of optical disks having, for example, a substrate thickness or a refractive index different from that of a magneto-optical disk. Moreover, a portion of the light beam is isolated from the returning light beam by a half mirror provided in the light path. The magneto-optical signals are detected based on the isolated portion of the returning light beam, but not on the returning light beam which passes through the polarized beam splitter. As a result, besides the additional half mirror which increases the number of the apparatus components, there is provided no effect of increasing the Kerr rotation angle.

SUMMARY OF THE INVENTION

According to an aspect of the invention, an optical pickup for irradiating a first recording medium and a second recording medium with light, wherein at least one of the substrate thickness and the refractive index of the first recording medium is different from that of the second recording medium, is provided. The optical pickup includes: a light source for emitting the light; a polarized beam splitter for receiving the light and for transmitting at least a portion of the light while reflecting the remaining portion of the light depending on the polarization direction of the light; a first objective lens for focusing the portion of the light reflected by the polarized beam splitter onto the first recording medium; and a second objective lens for focusing the portion of the light transmitted through the polarized beam splitter onto the second recording medium.

In one embodiment of the invention, the reflectance and the transmittance of the polarized beam splitter for first linearly polarized light are different from the reflectance and the transmittance of the polarized beam splitter for second linearly polarized light, the polarization direction of the first linearly polarized light being perpendicular to the polarization direction of the second linearly polarized light.

In another embodiment of the invention, the light emitted by the light source is the first linearly polarized light; and the transmittance of the polarized beam splitter for the first linearly polarized light is in a range of 60 to 80%, while the reflectance of the polarized beam splitter for the second linearly polarized light is 95% or higher. The first linearly polarized light and the second linearly polarized light have polarization directions perpendicular to each other.

In still another embodiment of the invention, at least one of the first recording medium and the second recording medium is a recording medium other than a magneto-optical recording medium.

In still another embodiment of the invention, one of the first recording medium and the second recording medium is a magneto-optical recording medium.

In still another embodiment of the invention, the first objective lens and the second objective lens are arranged substantially in a radial direction of the first recording medium or the second recording medium.

In still another embodiment of the invention, the optical pickup further includes a photodetector for receiving light reflected by the first recording medium or the second recording medium to output a signal based on the reflected light; and a first optical element provided between the light source and the polarized beam splitter for altering the polarization direction of the light, wherein light reflected by the recording medium is incident upon the photodetector via the polarized beam splitter.

In still another embodiment of the invention, the first optical element is a half-wave plate. Alternatively, the first optical element may be a liquid crystal panel having a twisted nematic liquid crystal layer.

In still another embodiment of the invention, the optical pickup further includes a second optical element for altering the polarization state of the light, wherein the second optical element is provided between the polarized beam splitter and the first objective lens, or between the polarized beam splitter and the second objective lens.

In still another embodiment of the invention, the polarized beam splitter has different reflectances for the first linearly polarized light and the second linearly polarized light which have different polarization directions perpendicular to each other, and the second optical element is a quarter-wave plate, with the crystal orientation of the quarter-wave plate being 45° with respect to the polarization direction of the first linearly polarized light and to the second linearly polarized light.

In still another embodiment of the invention, the second optical element is a quarter-wave plate, with the crystal orientation of the quarter-wave plate being 45° with respect to the polarization direction of the first linearly polarized light and to the second linearly polarized light.

In still another embodiment of the invention, the reflectance of the polarized beam splitter for the first linearly polarized light is smaller than the reflectance of the polarized beam splitter for the second linearly polarized light, and the second optical element is movably disposed in or out of the light path between the polarized beam splitter and the second objective lens. When the second linearly polarized light is to be incident upon the polarized beam splitter, the second optical element is moved out of the light path between the polarized beam splitter and the second objective lens.

In still another embodiment of the invention, the first optical element is a half-wave plate, while the second optical element is a quarter-wave plate, with the crystal orientation of the quarter-wave plate being 45° with respect to the polarization direction of the first linearly polarized light and to the second linearly polarized light; and the first optical element and the second optical element are movable by a single driving unit.

In still another embodiment of the invention, the optical pickup further includes a photodetector for receiving light reflected by the first recording medium or the second recording medium to output a signal based on the reflected light. The second optical element, which is a quarter-wave plate, is disposed so that the crystal orientation thereof is so set that an amount of light incident upon the photodetector after being reflected by the first recording medium is substantially the same as an amount of light incident upon the photodetector after being reflected by the second recording medium.

In still another embodiment of the invention, light reflected by the first recording medium and light reflected by the second recording medium are guided to the photodetector via the polarized beam splitter; and the photodetector includes a first detecting section for receiving a portion of the reflected light reflected by the polarized beam splitter, and a second detecting section for receiving a portion of the reflected light transmitted through the polarized beam splitter. The crystal orientation of the quarter-wave plate is so set that an amount of light incident upon the first detecting section after being reflected by the first recording medium is substantially the same as an amount of light incident upon the first detecting section after being reflected by the second recording medium, and than an amount of light incident upon the second detecting section after being reflected by the first recording medium is substantially the same as an amount of light incident upon the second detecting section after being reflected by the second recording medium.

In still another embodiment of the invention, the optical pickup further includes a lift-up-type magnetic head for applying a magnetic field to the magneto-optical recording medium. The magnetic head includes a core section for generating the magnetic field, and a sliding section for supporting the core section which is lifted up due to an air flow generated by rotation of the magneto-optical recording medium. The first objective lens and the second objective lens are arranged substantially in a tangential direction to the first recording medium or the second recording medium, and one of the first objective lens and the second objective lens that is designed for the magneto-optical recording medium is so arranged that the center of the optical axis thereof is substantially aligned with the center of the core section of the magnetic head, with the other one of the first objective lens and the second objective lens being located on the upstream side of the sir flow with respect to the objective lens designed for the magneto-optical recording medium.

Thus, the invention described herein makes possible the advantages of (1) providing an optical pickup which can be used for various types of optical disks including a magneto-optical disk, (2) providing an optical pickup which can efficiently guide a light beam to an objective lens to be used, and (3) providing an optical pickup by which a satisfactory C/N ratio can be obtained when detecting magneto-optical signals.

These and other advantages of the present invention will become apparent to those skilled in the art upon reading and understanding the following detailed description with reference to the accompanying figures.

BRIEF DESCRIPTION OF THE DRAWINGS

FIG. 15A shows a polarization state of a light beam before being incident upon a quarter-wave plate after being emitted from a light source; FIG. 15B shows a polarization state of a light beam after passing through the quarter-wave plate; and FIG. 15C shows a polarization state of a returning light beam (after being reflected by an optical disk) after again passing through the quarter-wave plate.

FIG. 21 is a side view for illustrating the detection of magneto-optical signals.

DESCRIPTION OF THE PREFERRED EMBODIMENTS

Figure 1:
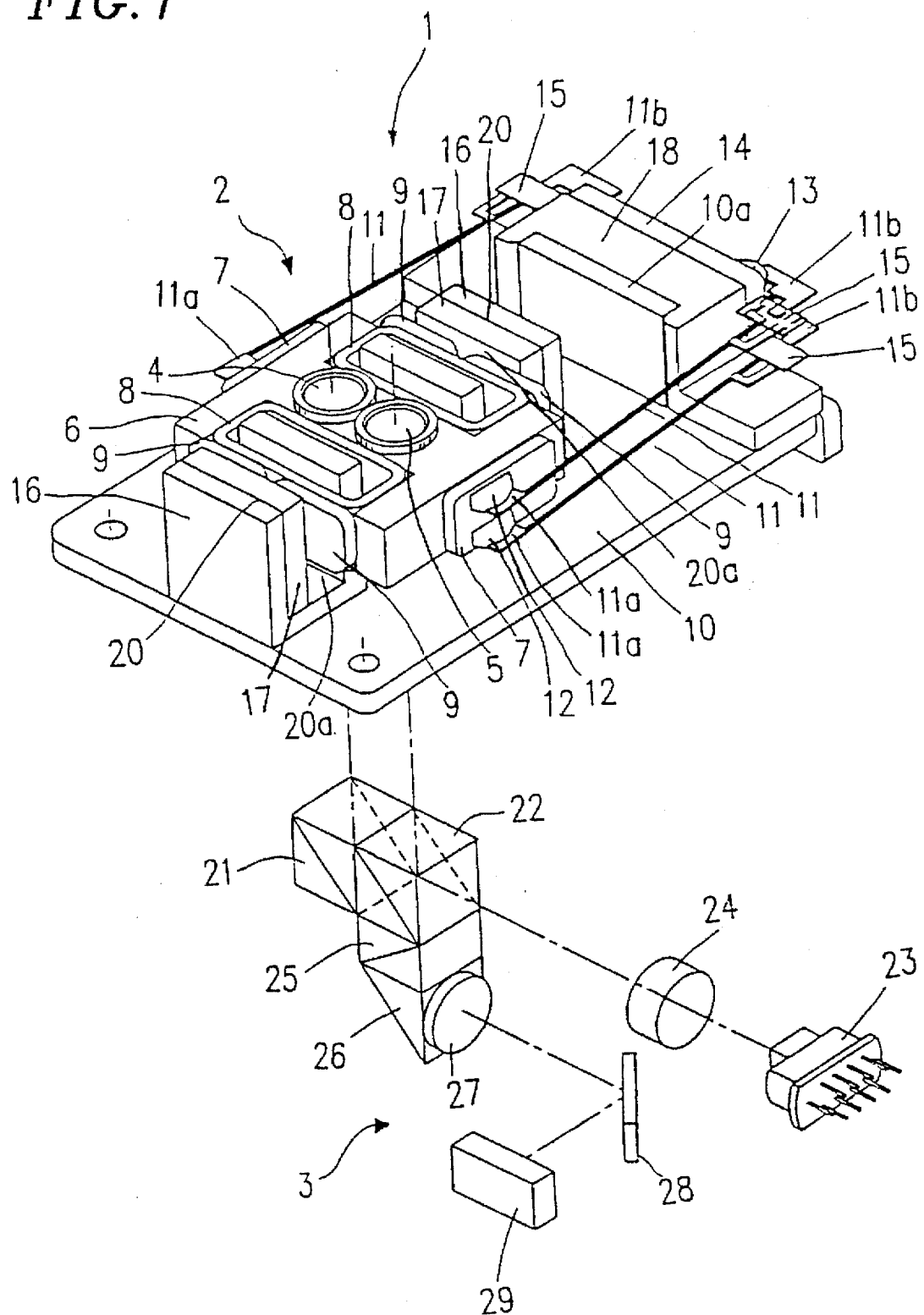
FIG. 1 is an exploded isometric view showing a configuration of an optical pickup according to Example 1 of the present invention.

Hereinafter, an optical pickup of the present invention will be described by way of illustrative examples with reference to the accompanying figures where same reference numerals denote same components.

The optical pickup of the present invention includes two objective lenses, and a polarized beam splitter which reflects/transmits a light beam at different rates depending on the polarization direction of the light beam. The two objective lenses are designed for two different types of optical disks which are different in at least one of the substrate thickness and the refractive index. One of the two types of optical disks is a recording medium other than a magneto-optical disk. The other optical disk may be an optical disk other than the magneto-optical disk or a magneto-optical disk. In the following examples, the case where one of the objective lenses is designed for a magneto-optical disk having a substrate thickness of 1.2 mm and a refractive index of 1.55, and the other objective lens is designed for an optical disk other than the magneto-optical disk, having a substrate thickness of 0.6 mm and a refractive index of 1.55 will be described.

EXAMPLE 1

Figure 2:
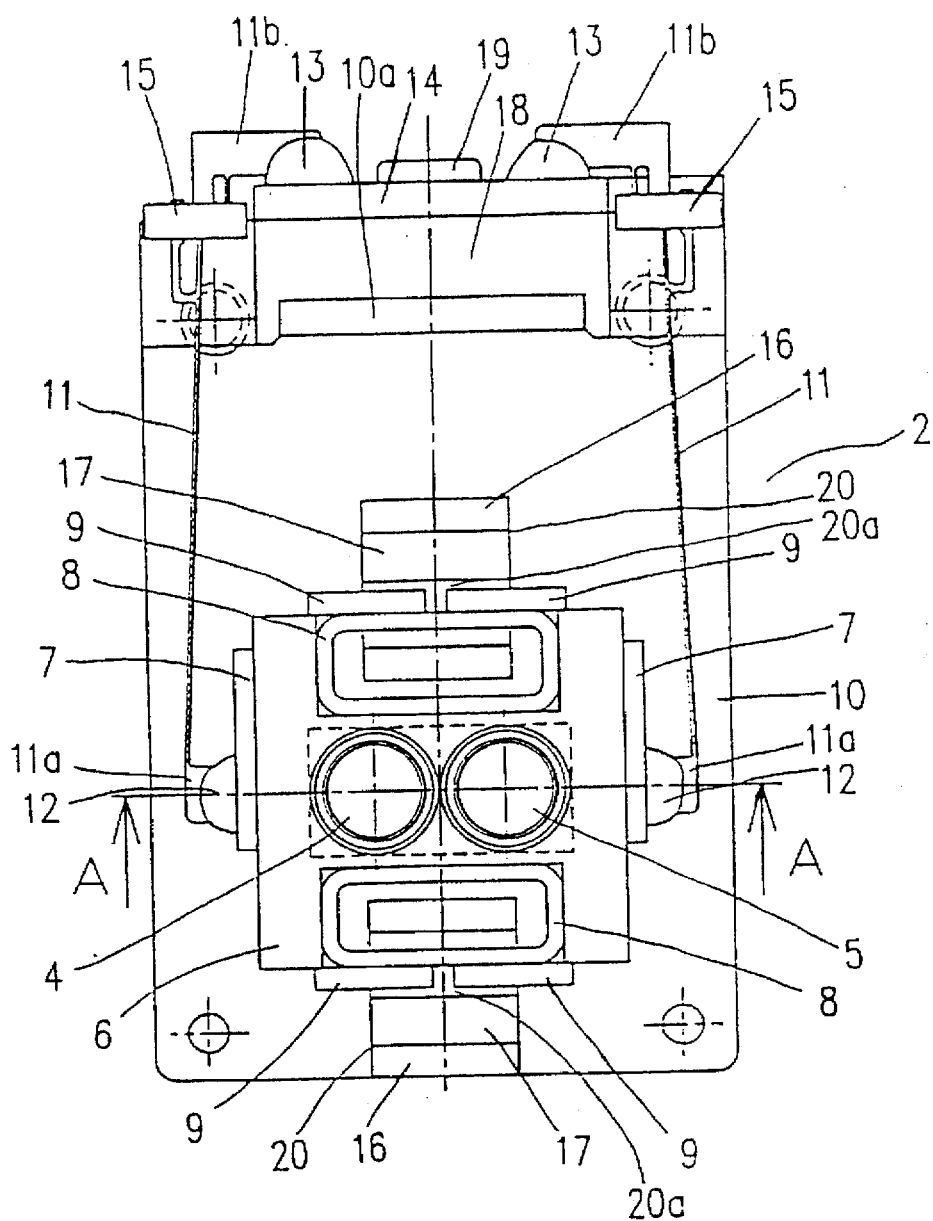
FIG. 2 is a plan view showing a configuration of an objective lens driving device shown in FIG. 1.
Figure 2:
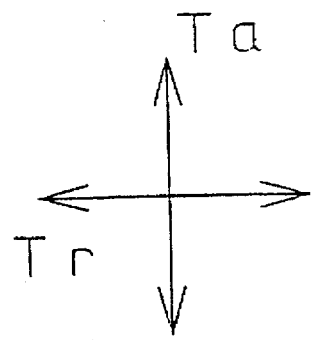
Figure 3:
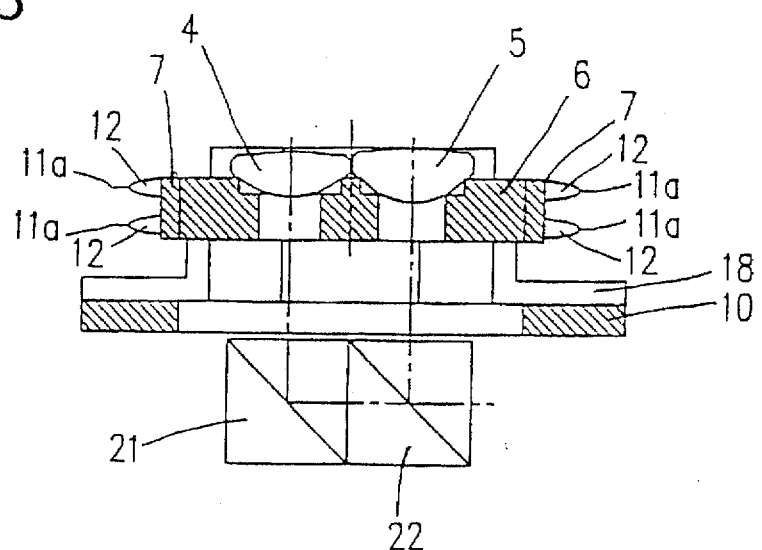
FIG. 3 is a cross-sectional view of the objective lens driving device taken along line A—A in FIG. 2 with an illustration of prisms.

FIG. 1 is an exploded isometric view showing a configuration of the optical pickup according to Example 1 of the present invention; FIG. 2 is a plan view showing a configuration of an objective lens driving device shown in FIG. 1; and FIG. 3 is a cross-sectional view of FIG. 2 taken along line A—A with an illustration of prisms located directly below the objective lenses and therefore is hidden in FIG. 2.

An optical pickup 1 accommodated in a housing (not shown) includes an objective lens driving device 2 and an optical system 3. The objective lens driving device 2 includes two objective lenses 4 and 5 for focusing a light beam on a recording medium. The two objective lenses 4 and 5 are each designed to have optical characteristics (specification) that are different from the other so that the objective lenses 4 and 5 can be used for different types of optical disks, as described above. In this example, the objective lens 4 is designed for a magneto-optical disk, whereas the objective lens 5 is designed for an optical disk other than the magneto-optical disk. Herein, the "specification" of the objective lens includes the numerical aperture (NA), the focal distance, the thickness of the corresponding cover glass and the like. The "substrate" herein refers to a depth of material through which a light beam travels to perform at least one of recording, reproducing, and erasing operations. Accordingly, the "substrate thickness" herein refers to a distance from the surface of the optical disk on the objective lens side to the recording film thereof.

A movable section of the objective lens driving device 2 includes the objective lenses 4 and 5, a lens holder 6 for accommodating the objective lenses 4 and 5, a pair of substrates 7 each attached to one side surface of the lens holder 6, and a plurality of focusing coils 8 and tracking coils 9 secured in recesses at both ends of the lens holder 6. A plurality of elastic bodies 11 are provided on the lower and upper sides of the side surfaces of the substrates 7; the elastic bodies 11 support the lens holder 6 in such a manner that the lens holder 6 can move in the focusing direction and/or in the tracking direction with respect to a base 10. One end 11a of the elastic bodies 11 are each secured onto the substrate 7 with a solder 12, whereas the other end 11b of the elastic bodies 11 are each secured onto a substrate 14 with a solder 13. A pair of dampers 15 are secured to base portions of the elastic bodies 11 in the vicinity of the end 11b of the elastic bodies 11. The dampers 15 damp (or absorb) the resonance of the elastic bodies 11.

A substantially U-shaped yoke 16 is mounted on the base 10. A permanent magnet 17 is secured onto one surface of the yoke 16. The substrate 14 is fixed to a wall 10a extending upward from the base 10 via a spacer 18 with a screw 19. Portions of the focusing coils 8 and the tracking coils 9 are positioned in a magnet gap 20a of a magnetic circuit 20 formed between the yoke 16 and the permanent magnet 17. Terminals of the focusing coils 8 and the tracking coils 9 are electrically connected to the substrate 14 via the substrate 7 and the elastic bodies 11.

Due to such a configuration, it is possible to drive the movable section of the objective lens driving device 2 independently in the focusing direction (parallel to an optical axis of a light beam) and in the tracking direction (parallel to a radius of an optical disk) by applying an electric current through the focusing coils 8 and the tracking coils 9, respectively.

The optical system 3 includes a reflection mirror 21, a polarized beam splitter 22, a hologram laser unit 23, a collimator lens 24, and a Wollaston prism 25, a reflection mirror 26, a spot lens 27, a reflection mirror 28, and a photodetector 29. The reflection mirror 21 and the polarized beam splitter 22 are located directly below the objective lenses 4 and 5, respectively.

Figure 4:
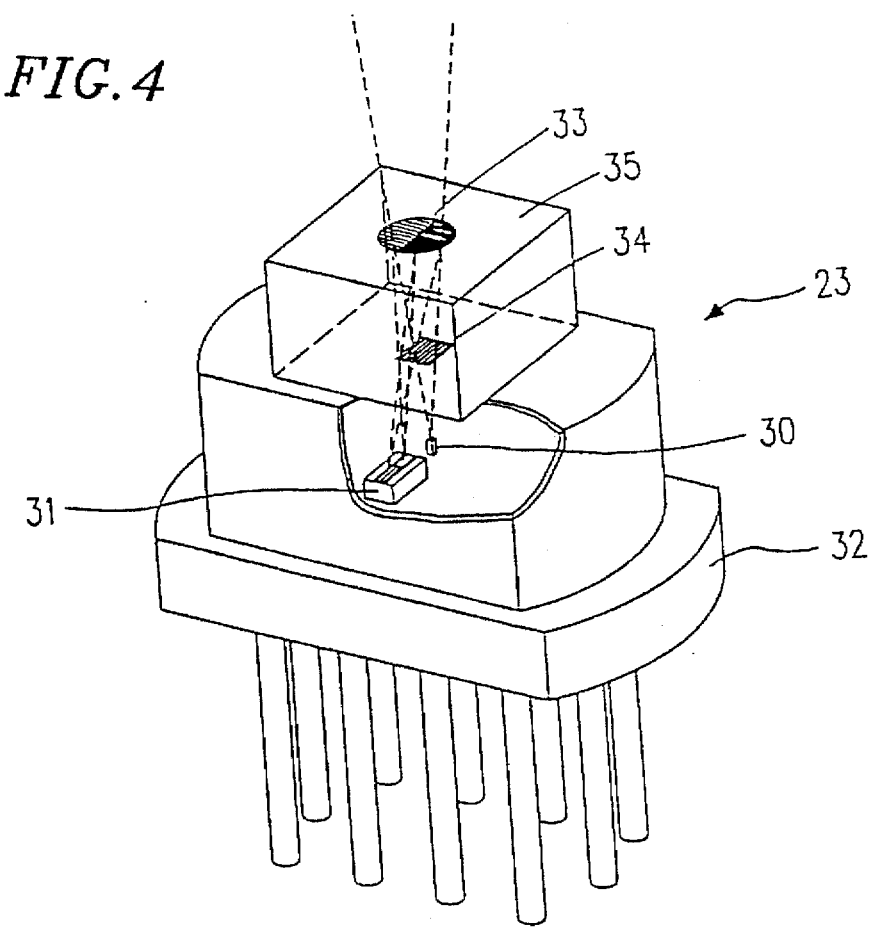
FIG. 4 is an isometric view showing a configuration of a hologram laser unit.

FIG. 4 is an isometric view showing a configuration of the hologram laser unit 23.

As shown in FIG. 4, the hologram laser unit 23 includes a laser diode 30 and a photodiode 31 accommodated in a package 32. A holographic optical element 33 and a diffraction grating 34 are formed on the upper and lower surfaces of a glass substrate 35 fixed onto the upper surface of the package 32. A light beam emitted by the laser diode 30 is divided into three beams, i.e., a main beam and two sub beams, by the diffraction grating 34. The three light beams are incident on the holographic optical element 33 to pass therethrough as zero-order light. The light beams thus emitted from the hologram laser unit 23 travel to the optical disk via the other optical elements included in the optical system 3. A portion of the light beams reflected by the optical disk return to the holographic optical element 33 via the same light path to be diffracted. The plus or minus first order diffracted light beam is guided onto the detecting surface of the photodiode 31 which is divided into five regions. Based on the light beams incident on a detecting surface of the photodiode 31, servo signals including a focus error signal and a tracking error signal can be obtained.

Figure 5:
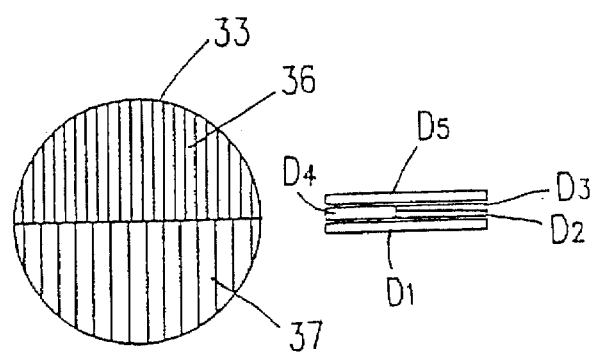
FIG. 5 is a schematic diagram showing the positional relationship between a holographic optical element and a photodiode.

FIG. 5 shows a positional relationship between an arrangement of the diffraction surface of the holographic optical element 33 and an arrangement of the detecting surface of the photodiode 31.

The holographic optical element 33 includes two regions 36 and 37, each having a grating pitch different from the other. A portion of the returning main beam, which is incident upon the region 36, is focused on the division line between detecting sections $D_2$ and $D_3$. A portion of the returning main beam which is incident upon the region 37 is focused on a detecting section $D_4$. The returning sub-beams are each focused on one of the detecting sections $D_1$ and $D_5$. Assuming the outputs of the detecting sections $D_1$ to $D_5$ of the 5-divided photodiode 31 to be $S_1$ to $S_5$, respectively, a focus error signal FES is obtained by an expression:

$$FES=S_2-S_3 \qquad (1),$$

whereas a tracking error signal TES is detected based on a so-called "three-beam method" and is obtained by an expression:

$$TES=S_1-S_5 \qquad (2).$$

The focus error signal FES and the tracking error signal TES are used for controlling the position of the optical pickup in the focusing direction and the tracking direction, respectively.

In addition, in the case of an optical disk whose signals recorded thereon can be reproduced based on the intensity of the reflected light beams, i.e., an optical disk other than a magneto-optical disk, a reproduction signal RF can also be obtained using the outputs of the photodiode 31 by an expression:

$$RF=S_2+S_3+S_4 \qquad (3).$$

Figure 6:
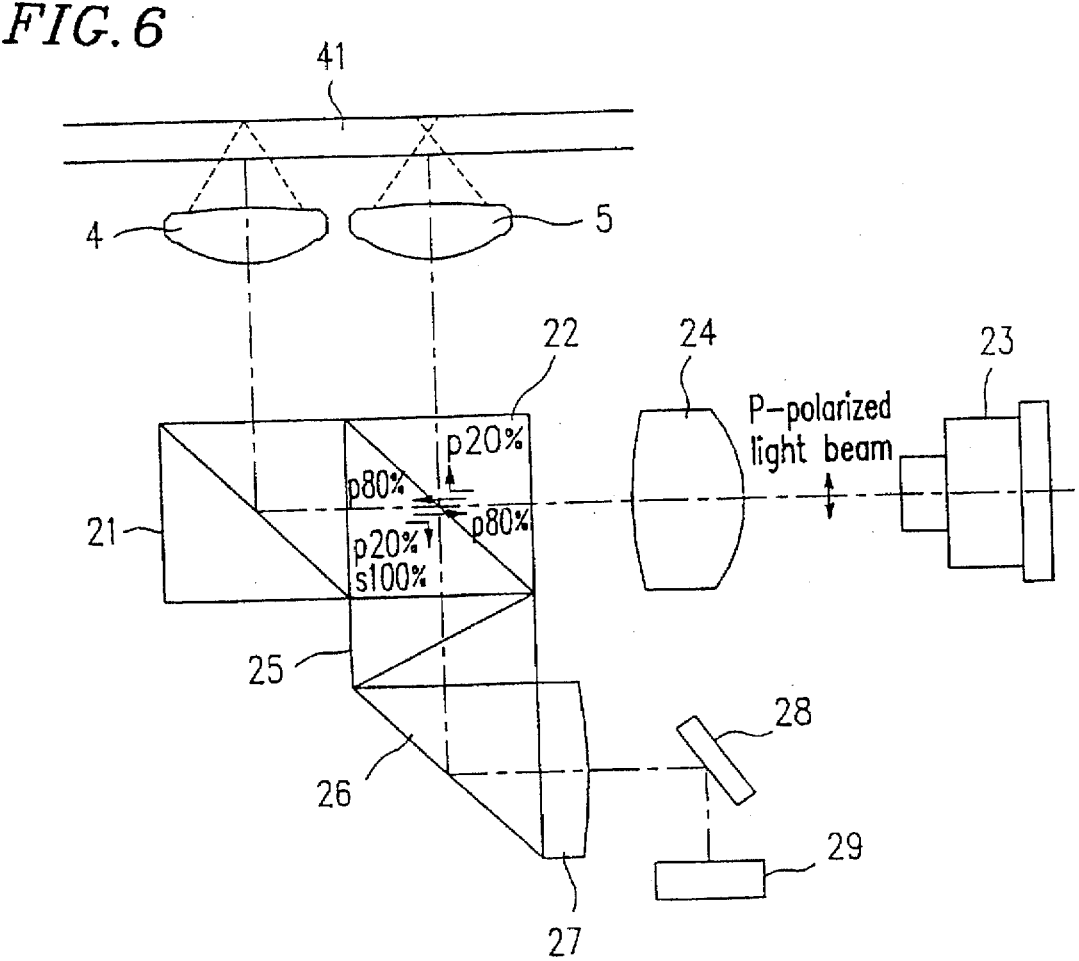
FIG. 6 is a side view illustrating a manner in which a light beam is divided according to Example 1 of the present invention.

FIG. 6 is a side view of the optical system 3 and the objective lenses 4 and 5 illustrating distribution of a light beam. Referring to FIG. 6, the operation of dividing light into two beams to be respectively direction to the two objective lenses 4 and 5 and the detection of the magneto-optical signals will be described.

A p-polarized light beam emitted by the hologram laser unit 23 is collimated by the collimator lens 24, and is then incident upon the polarized beam splitter 22. The polarized beam splitter 22 is designed to transmit about 80% and reflect about 20% of the p-polarized component of the light beam incident thereupon, while reflecting substantially 100% of the s-polarized component of the light incident thereupon. Therefore, about 80% of the collimated p-polarized light beam from the collimate lens 24 passes through the polarized beam splitter 22, is reflected by the reflection mirror 21, and is incident upon the objective lens 4. The remaining portion (about 20%) of the p-polarized light beam is reflected by the polarized beam splitter 22 and is incident upon the objective lens 5.

In the case where a magneto-optical disk is used as the optical disk 41, the objective lens 4, which is designed for the magneto-optical disk, is used. The recording surface of the magneto-optical disk 41 is irradiated with a light beam through the objective lens 4. The polarization direction of the light beam is slightly rotated or inclined (i.e., a small portion of the p-polarized component is altered to be an s-polarized component) due to the Kerr effect when reflected by the magneto-optical disk 41. Such a light beam returns to the polarized beam splitter 22 having a reflectance of about 20% for a p-polarized light beam and a reflectance of substantially 100% for an s-polarized light beam. The light beam is reflected by the polarized beam splitter 22 with the p-polarized component thereof being reduced due to the low reflectance for a p-polarized light beam, while substantially 100% of the s-polarized component thereof is reflected. As a result, the Kerr rotation angle of the light beam is increased.

Such a light beam having the increased Kerr rotation angle is divided into two light beams by the Wollaston prism 25, which have polarization directions of about 45° with respect to the polarization directions of the p-polarized light and the s-polarized light, respectively. The two light beams are then incident upon the photodetector 29 via the reflection mirror 26, the spot lens 27 and the mirror 28. The photodetector 29 outputs a magneto-optical signal based on the light beams incident thereupon.

The portion of the returning light beam transmitted through the polarized beam splitter 22 returns to the hologram laser unit 23 and is incident upon the photodiode 31 included in the hologram laser unit 23. The photodiode 31 generates servo signals including the focus error signal FES and the tracking error signal TES, based on the light beam incident thereupon.

Simultaneously, as the portion of the light beam transmitted through the polarized beam splitter 22 is incident upon the objective lens 4, the remaining portion (about 20%) of the light beam reflected by the polarized beam splitter 22 is incident upon the objective lens 5. Such a light beam is also reflected by the magneto-optical disk 41 and returns to the photodetector 29 for detecting magneto-optical signals and the photodiode 31 in the hologram laser unit 23. However, the specification of the objective lens 5 is different from that of the objective lens 4, which is designed for a type of magneto-optical disk. Therefore, the light beam from the objective lens 5 is not properly focused on the recording surface of the magneto-optical disk 41, and thus cannot form a light spot having an appropriate size for the recording, reproducing or the erasing operation of the magneto-optical disk 41. Such an unfocused (or insufficiently focused) light beam has substantially no influence on the recording, the reproducing, or the erasing operation with respect to the magneto-optical disk 41.

In the above description, the case where the optical disk for which the objective lens 4 is designed is a magneto-optical disk was described. However, the objective lens 4 can also be used for an optical disk other than the magneto-optical disk as long as it has the same substrate thickness and the refractive index as those of the magneto-optical disk for which the objective lens 4 is designed. In such a case, the photodiode 31 in the hologram laser unit 23 may be used for detecting both servo signals and reproduction signals by the above equations (1) to (3), without using the photodetector 29 for detecting magneto-optical signals.

Next, the operation where the optical disk 41 is an optical disk for which the objective lens 5 is designed will be described. Herein, the optical disk corresponding to the objective lens 5 is an optical disk other than a magneto-optical disk having a substrate thickness of 0.6 mm and a refractive index of 1.55, as described above. The objective lens 4, therefore, cannot be used for the recording, the reproducing or the erasing operation of this optical disk because the objective lenses 4 and 5 have different specifications.

The p-polarized light beam emitter from the hologram laser unit 23 is incident on the polarized beam splitter 22, and about 20% thereof is reflected to be incident upon the objective lens 5. The objective lens 5 focuses the incident light beam onto the optical disk 41. Then, the light beam reflected by the optical disk 41, returns to the polarized beam splitter 22 via the objective lens 5 with its polarization direction unchanged. About 20% of the returning light beam is reflected by the polarized beam splitter 22 and is incident upon the hologram laser unit 23. The hologram laser unit 23 outputs servo signals and reproduction signals RF based on the light beam incident thereupon.

The remaining portion (about 80%) of the returning light beam transmitted through the polarized beam splitter 22 is incident upon the photodetector 29. Therefore, the servo signals and the reproduction signals RF can alternatively be detected based on the detection signals output by the photodetector 29.

Simultaneously, as the light beam is incident upon the objective lens 5 from the polarized beam splitter 22, the remaining portion of the light beam is incident upon the objective lens 4. However, as described above, this has substantially no influence on the recording, the reproducing, or the erasing operation of the optical disk 41 since the objective lens 4 cannot sufficiently focus the light beam onto the optical disk 41.

The transmittance and the reflectance of the polarized beam splitter 22 for a p-polarized light beam is not limited to the above example (about 80% and 20%, respectively). However, the transmittance for a p-polarized light beam is preferably about 60 to 80% in order to efficiently increase the Kerr rotation angle when detecting magneto-optical signals and to ensure an appropriate amount of light to be distributed to the objective lens 5. The reflectance for an s-polarized light beam is preferably as close to 100% as possible. Although it is substantially unfeasible to fabricate components which realize a reflectance of 100%, the reflectance is preferably at least about 95%.

When using the objective lens 5, a light beam is split twice by the polarized beam splitter 22 via the incoming/returning light paths. This greatly reduces the light amount of a light beam. However, with a high-power laser designed for a type of magneto-optical disk, a light beam of a power sufficient to perform a read operation can be ensured despite the loss of light.

It has been assumed that the polarized beam splitter 22 has a transmittance of about 60 to 80% for a p-polarized light beam and a reflectance of about 95 to 100% for an s-polarized light beam. However, it is also applicable to design the polarized beam splitter 22 to have a transmittance of about 95 to 100% for a p-polarized light beam and a reflectance of about 60 to 80% for an s-polarized light beam. In such a case, in order to make one of the two objective lens correspond to a magneto-optical disk, an s-polarized light beam needs to be emitted toward the polarized beam splitter 22 and thus the objective lens corresponding to the magneto-optical disk is disposed directly above the polarized beam splitter 22. Therefore, the locations of the objective lenses 4 and 5 are swapped in the arrangement shown in FIG. 1.

Typically, an optical disk which can be recorded and reproduced such as a magneto-optical disk has a relatively low recording density as compared to read-only type optical disks. Accordingly, there has been a demand for allowing an area of a magneto-optical disk in the vicinity of the inner periphery thereof to be utilized, thereby realizing a larger recording capacity. To meet such a demand, in the case where the two objective lenses are arranged in a direction parallel to a radius of the optical disk, the objective lens for a magneto-optical disk and the like is preferably located as close to the end of the optical pickup 1 as possible.

However, when the polarized beam splitter 22 is designed to have a reflectance of about 60 to 80% for an s-polarized light beam and a transmittance of about 95 to 100% for a p-polarized light beam, the objective lens for a magneto-optical disk is not located at the end of the optical pickup 1. Therefore, it is preferably that the polarized beam splitter 22 is designed to have a transmittance of about 60 to 80% for a p-polarized light beam and a reflectance of about 95 to 100% for an s-polarized light beam, whereby a light beam transmitted through the polarized beam splitter 22 is used for performing the recording, reproducing and erasing operations for the magneto-optical disk.

EXAMPLE 2

Figure 7:
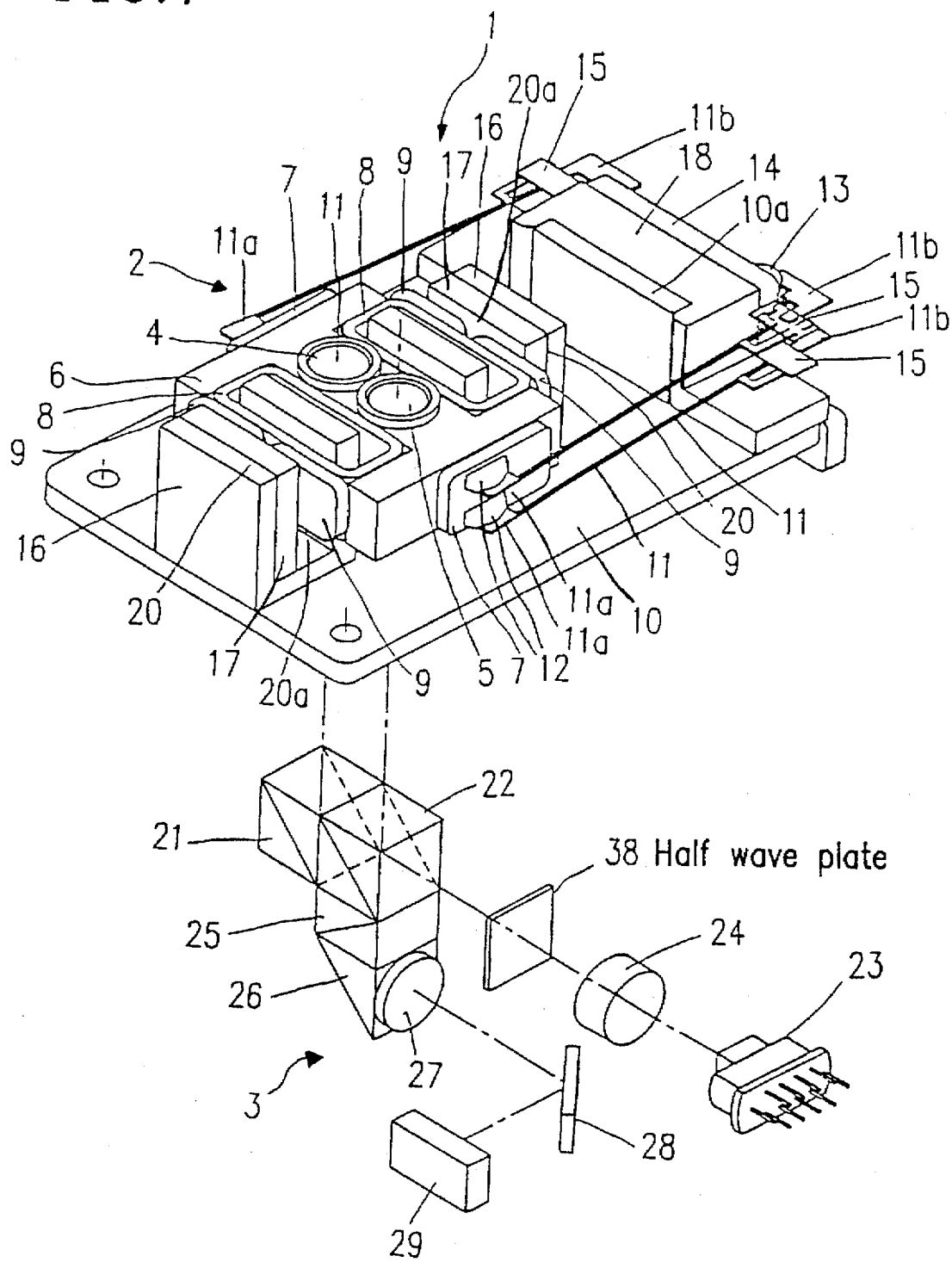
FIG. 7 is an exploded isometric view showing a configuration of an optical pickup according to Example 2 of the present invention.

FIG. 7 is an exploded isometric view showing a configuration of an optical pickup according to Example 2 of the present invention. The objective lens driving device 2 has the same configuration as in Example 1, and therefore will not be further described. The optical system 3 has the same configuration as in Example 1 except for a polarization direction altering device 38 provided between the collimator lens 24 and the polarized beam splitter 22.

Generally, the polarization state of a light beam is determined by the amplitudes of two linearly polarized components of the light beam perpendicular to each other and the phase difference between the two components. A light beam is most likely to be elliptically-polarized. However, when the amplitudes of the two components are the same and the phase difference thereof is $\pi/2$, the light beam is circularly-polarized, whereas, when the phase difference between the two components is zero, the light beam is linearly-polarized. In this specification, "to alter the polarization state" means to switch between the circular polarization (or the elliptic polarization) and the linear polarization; and "to alter the polarization direction" means to alter substantially only the polarization direction of the linearly-polarized light beam.

As described in Example 1, when the objective lens 5 is used, a light beam is split twice by the polarized beam splitter 22 via the incoming/returning light paths. This greatly reduces the light amount of the light beam. In Example 2, however, in order to minimize the loss of light, the polarization direction altering device 38 is provided between the collimator lens 24 and the polarized beam splitter 22.

Figure 8:
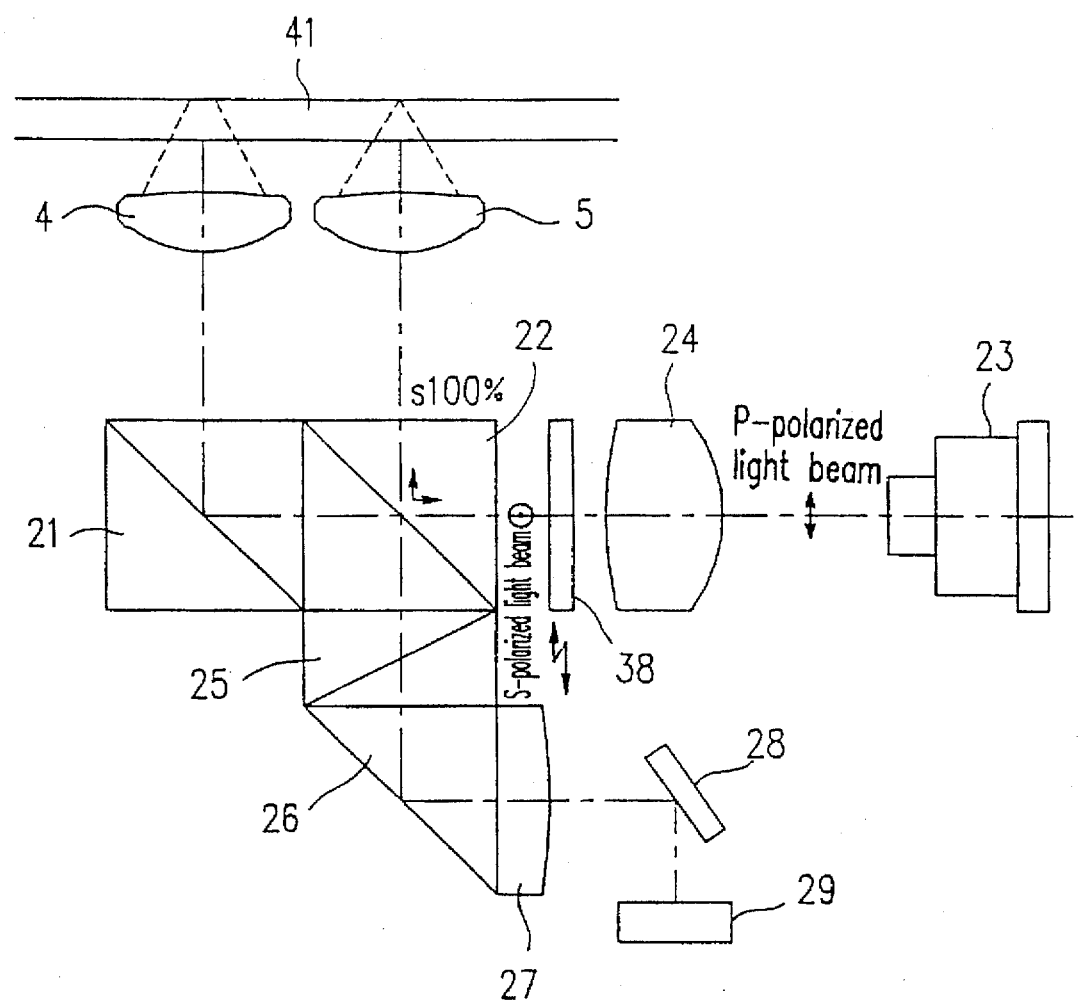
FIG. 8 is a side view illustrating a manner in which a light beam is divided according to Example 2 of the present invention.

FIG. 8 is a side view of the optical system 3 and the objective lenses 4 and 5 illustrating the distribution of a light beam. Referring to FIG. 8, the operation of the optical system 3 according to Example 2 will be described on the assumption that the polarization direction altering device 38 is a half-wave plate, and the polarization direction of the light beam emitted by the hologram laser unit 23 is a p-polarized light beam.

The half-wave plate 38 is arranged to have a crystal orientation of about 45° with respect to the polarization direction of the light beam incident thereupon. When a light beam passes through such a half-wave plate 38 provided in the light path, the polarization direction of the light beam is rotated by about 90°, thereby becoming an s-polarized light beam. The s-polarized light beam is then incident upon the polarized beam splitter 22. Since the polarized beam splitter 22 is designed to have a reflectance of substantially 100% for an s-polarized light beam, substantially all the light beam incident thereupon is reflected by the polarized beam splitter 22 to be incident upon the objective lens 5. As a result, the above-described loss of light can be minimized.

When the half-wave plate 38 is removed from the light path, a p-polarized light beam is incident upon the polarized beam splitter 22 as in Example 1. The operation thereafter of the optical system 3 is the same as in Example 1. Thus, it is possible to alter the polarization direction of the light beam before being incident upon the polarized beam splitter 22 by moving the half-wave plate 38 so as to be alternately in and out of the light path. As a result, it is possible to more efficiently utilize the light beam when using the objective lens 5. The half-wave plate 38 may be moved alternately in and out of the light path by, for example, moving a slide table using a motor with the half-wave plate 38 being fixed to the slide table, or rotating a plate holding the half-wave plate 38. However, the present invention is not limited to these examples.

Instead of moving the half-wave plate 38 in such a manner, the half-wave plate 38 can be rotated by about 45° about the optical axis of the light beam. When the crystal orientation of the half-wave plate 38 and the polarization direction of the light beam incident thereupon are the same, the polarization direction of the light beam is not altered (remains p-polarized). On the other hand, when the half-wave plate 38 is rotated by about 45°, the polarization direction of the light beam is rotated by about 90° (becomes s-polarized). The half-wave plate 38 may be rotated directly by a rotation motor. However, the present invention is not limited to this example.

Alternatively, a TN (twisted nematic) liquid crystal panel having a TN liquid crystal layer interposed between a pair of substrates, wherein orientations of the liquid crystal molecules twist (or vary) by 90° between the substrates, can be used as the polarization direction altering device 38. Such a TN liquid crystal panel rotates the polarization direction of the light beam incident thereupon by 90° when no voltage is applied thereto. On the other hand, the TN liquid crystal panel does not rotate the polarization direction of the light beam incident thereupon when a voltage is applied thereto. Therefore, it is possible to alter the polarization direction of the light beam to be incident upon the polarized beam splitter 22 between the p-polarization and the s-polarization direction by applying or not applying a voltage to the TN liquid crystal panel. Other than the TN liquid crystal panel, the operation of the optical system 3 is the same as with the half-wave plate. As described above, with the TN liquid crystal panel, it is possible to alter the polarization direction of the light beam by applying or not applying a voltage to the TN liquid crystal panel. Therefore, a mechanical driving mechanism is not necessary. As a result, the configuration of the optical system 3 can be simplified and the number of apparatus components can be reduced.

EXAMPLE 3

Figure 9:
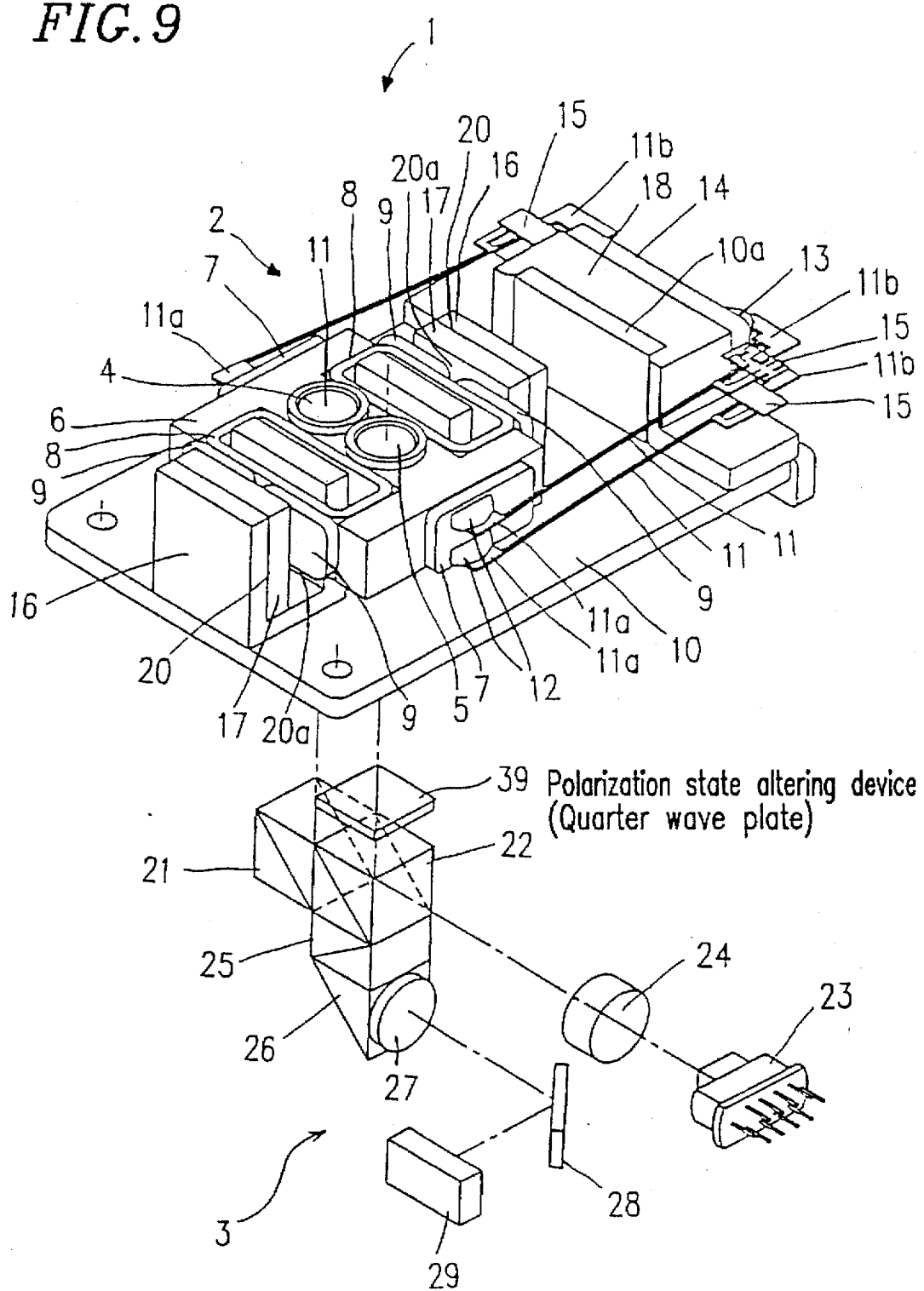
FIG. 9 is an exploded isometric view showing a configuration of an optical pickup according to Example 3 of the present invention.
Figure 10:
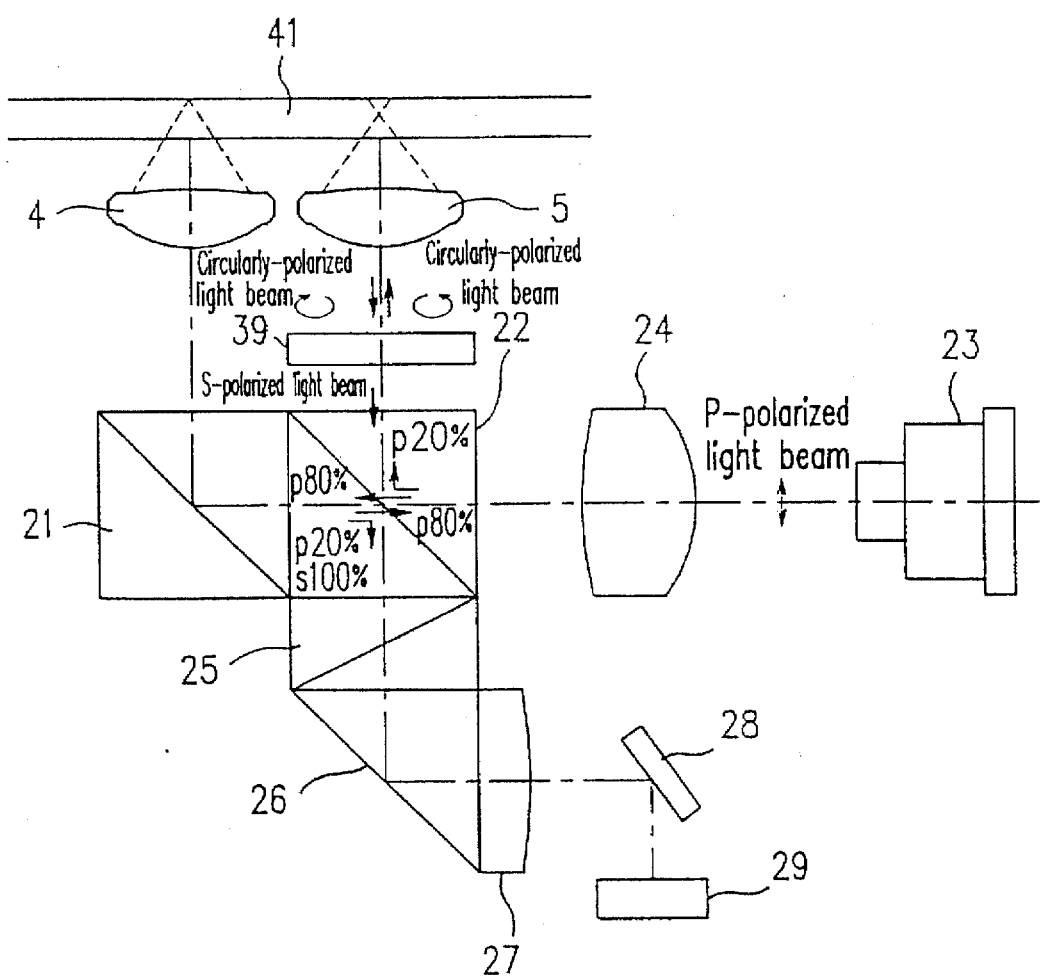
FIG. 10 is a side view illustrating a manner in which a light beam is divided according to Example 3 of the present invention.

FIG. 9 is an exploded isometric view showing a configuration of the optical pickup according to Example 3 of the present invention; and FIG. 10 is a side view of the optical system 3 and the objective lenses 4 and 5 illustrating distribution of a light beam. The objective lens driving device 2 has the same configuration as in Example 1, and therefore will not be further described. The optical system 3 has the same configuration as in Example 1 except for a polarization state altering device 39 provided between the second objective lens 5 and the polarized beam splitter 22.

As describe in Example 1, simultaneously as the light beam is incident upon the objective lens 4, the remaining portion (about 20%) of the light beam is incident upon the objective lens 5, reflected by the magneto-optical disk, and then incident upon the photodetector 29 for detecting magneto-optical signals and the photodiode 31 in the hologram laser unit 23. As described above, this has substantially no influence since the specifications of the objective lenses 4 and 5 are different from each other, and therefore the light beam is not properly focused on the recording surface, thereby resulting in an unfocused light beam on the photodetector 29. However, since a subtle change in the polarization direction is detected especially when detecting magneto-optical signals, a noise is generated when the p-polarized component reflected by the magneto-optical disk is incident upon the photodetector 29 for detecting magneto-optical signals. Therefore, it is desirable to prevent an unnecessary light beam from being incident upon the photodetector 29.

In Example 3, in order to prevent an unnecessary light beam from being incident upon the photodetector 29, a polarization state altering device is provided between the objective lens 5 and the polarized beam splitter 22. The polarization state altering device is, for example, a quarter-wave plate. The quarter-wave plate is arranged to have the crystal orientation of about 45° with respect to a p-polarized light beam and an s-polarized light beam. Thus, a linearly-polarized light beam is altered to be a circularly-polarized light beam when passing through the quarter-wave plate.

A p-polarized light beam emitted by the hologram laser unit 23 is collimated by the collimator lens 24, and is incident upon the polarized beam splitter 22. As in Example 1, the polarized beam splitter 22 is designed to transmit about 80% and reflect about 20% of the p-polarized light beam incident thereupon. The light beam transmitted through the polarized beam splitter 22 is incident upon the objective lens 4 and is used for performing at least one of recording, reproducing and erasing operations for the magneto-optical disk.

The remaining portion (about 20%) of the light beam reflected by the polarized beam splitter 22 is altered to be a circularly-polarized light beam when passing through the quarter-wave plate 39, and is incident upon the optical disk 41 via the second objective lens 5. The light beam is reflected by the optical disk 41 with the rotational direction of circular polarization thereof being inverted. That is, when a right-handedness circularly polarized light beam is incident on the optical disk 41, a left-handedness circularly polarized light returns.

When the circularly polarized light beam reflected by the optical disk 41 again passes through the quarter-wave plate 39, it becomes a linearly-polarized light beam (an s-polarized light beam) with the polarization direction thereof being consequently rotated by about 90° with respect to the polarization direction of the incoming light beam. Therefore, the polarized beam splitter 22 reflects substantially all the returning light beam. Thus, light beams unnecessary for detecting magneto-optical signals can be prevented from being incident upon the photodetector 29 for detecting magneto-optical signals.

As described above, by providing a quarter-wave plate between the second objective lens 5 and the polarized beam splitter 22, it is possible to improve the light-using efficiency when using the second objective lens 5. More specifically, this example is the same as Example 1 in that about 20% of the p-polarized component reflected by the polarized beam splitter 22 is incident on the second objective lens 5. However, in Example 1, the light beam is reflected by the optical disk and returns to the polarized beam splitter 22 with the polarization direction of the light beam being unchanged (p-polarized light beam). Therefore, the light beam is again split by the polarized beam splitter 22 and, as a result, the amount of light of the light beam returning to the photodiode 31 in the hologram laser unit 23 is reduced. On the other hand, in this example, the returning p-polarized light beam is altered to be an s-polarized light beam by the polarized beam splitter 22. Therefore, substantially all the light beam is reflected by the polarized beam splitter 22 and is incident upon the hologram laser unit 23.

EXAMPLE 4

Figure 11:
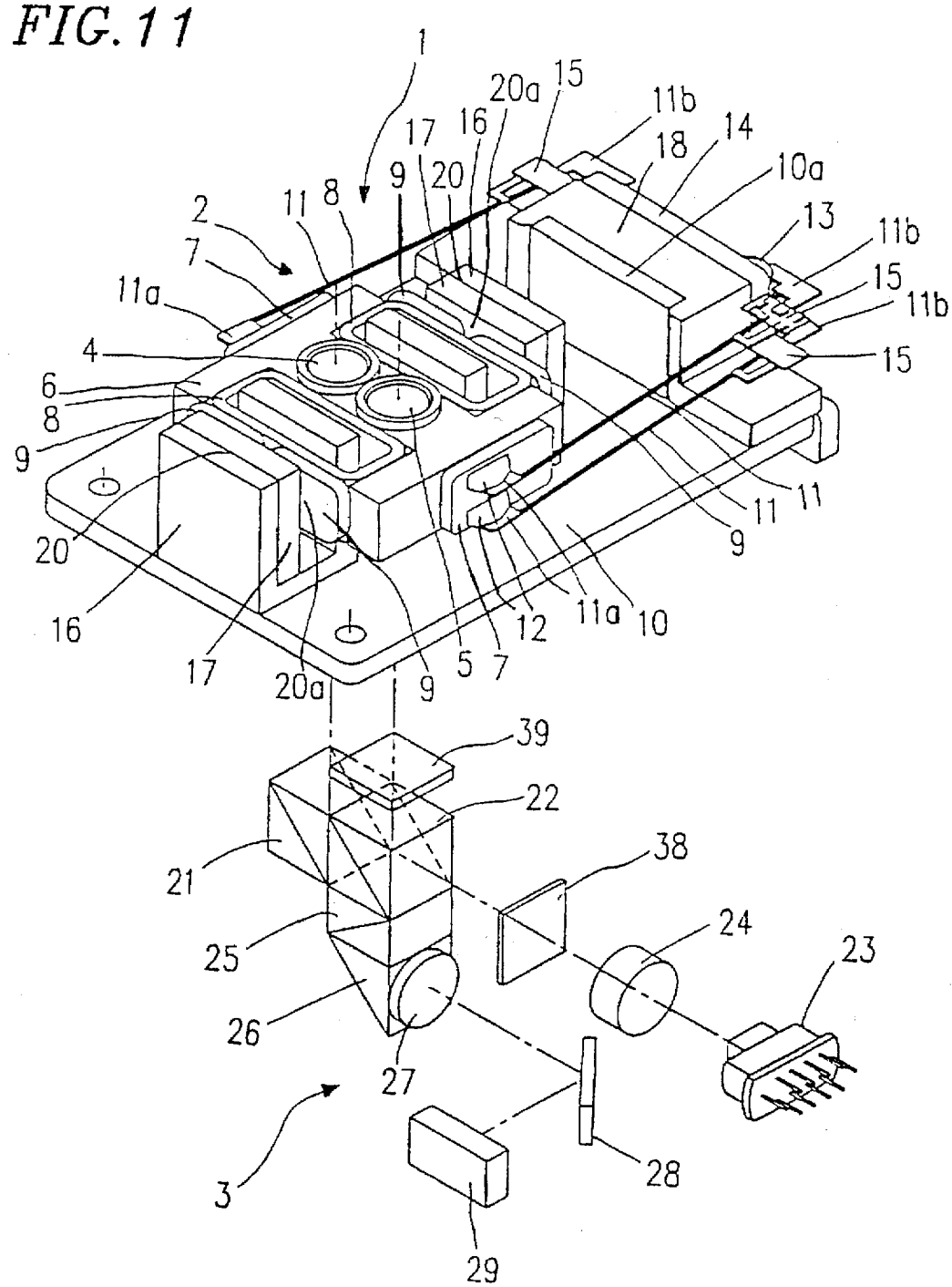
FIG. 11 is an exploded isometric view showing a configuration of an optical pickup according to Example 4 of the present invention.

FIG. 11 is an exploded isometric view showing a configuration of an optical pickup according to Example 4 of the present invention. The objective lens driving device 2 has the same configuration as in Example 1, and therefore will not be further described. The optical system 3 has the same configuration as in Example 1 except for a polarization direction altering device 38 provided between the collimator lens 24 and the polarized beam splitter 22, and a polarization state altering device 39 provided between the second objective lens 5 and the polarized beam splitter 22. Example 4 is a combination of Examples 2 and 3. In other words, Example 4 is obtained by adding to Example 1 a half-wave plate as a polarization direction altering device and a quarter-wave plate with a crystal orientation of about 45° with respect to a p-polarized light beam and an s-polarized light beam as a polarization state altering device.

The operation of irradiating a magneto-optical disk with a light beam using the first objective lens 4 will be described.

When using the first objective lens 4, the half-wave plate 38 is not placed in the light path, but the quarter-wave plate 39 is placed in the light path. As in Example 1, a p-polarized light beam emitted by the hologram laser unit 23 is collimated by the collimator lens 24, and is incident upon the polarized beam splitter 22 while remaining a p-polarized light beam. About 80% of the light beam passes through the polarized beam splitter 22 and is incident upon the first objective lens 4 to be used for a magneto-optical disk.

The remaining portion (about 20%) of the light beam reflected by the polarized beam splitter 22 is incident upon the second objective lens 5. However, the light beam passes through the quarter-wave plate 39 twice via the incoming/returning light paths. Therefore, the light beam is altered to be an s-polarized light beam to be again incident upon the polarized beam splitter 22. As in Example 3, the polarized beam splitter 22 reflects substantially all the s-polarized light beam, thereby preventing an unnecessary light beam from being returned to the photodetector 29 for detecting magneto-optical signals.

Also, when using the first objective lens 4 for irradiating an optical disk other than a magneto-optical disk with a light beam, the half-wave plate 38 and the quarter-wave plate 39 are both used as described above. Again, servo signals and reproduction signals RF can be detected by the photodiode 31 in the hologram laser unit 23 based on the light beam reflected by the polarized beam splitter 22 to return to the hologram laser unit 23.

Figure 12:
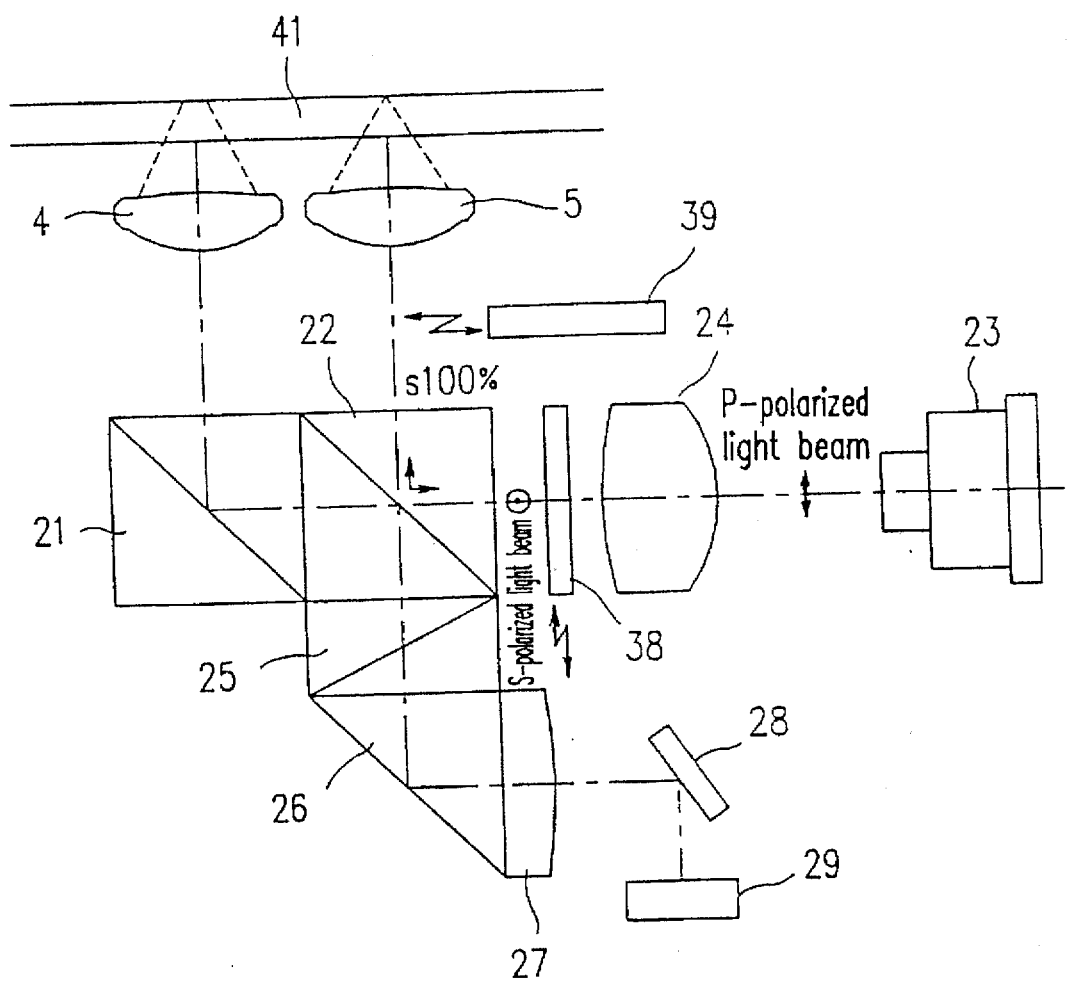
FIG. 12 is a side view illustrating a manner in which a light beam is divided according to Example 4 of the present invention.

FIG. 12 is a side view of the optical system 3 and the objective lenses 4 and 5 illustrating the distribution of a light beam. Referring to FIG. 12, the operation of irradiating an optical disk other than a magneto-optical disk with a light beam using the second objective lens 5 will be described.

The half-wave plate 38 having a crystal orientation of about 45° with respect to the polarization direction of a light beam incident thereupon is placed in the light path, while the quarter-wave plate 39 is pulled out of the light path. A p-polarized light beam emitted by the hologram laser unit 23 is collimated by the collimator lens 24 and is incident upon the half-wave plate 38. The half-wave plate 38 alters the p-polarized light beam passing therethrough to be an s-polarized light beam. The s-polarized light beam is incident upon the polarized beam splitter 22. Substantially 100% of the light beam is reflected by the polarized beam splitter 22 and is incident upon the second objective lens 5.

The polarization direction of the returning s-polarized light beam reflected by the optical disk 41 is not altered since the quarter-wave plate 39 has been moved out of the light path. The s-polarized light beam thus returns to the polarized beam splitter 22 without passing through the quarter-wave plate 39. The polarized beam splitter 22 reflects substantially 100% of the s-polarized light beam incident thereupon. Therefore, the light beam efficiently returns to the photodiode 31 in the hologram laser unit 23.

As described above, when the polarization direction altering device 38 and the polarization state altering device 39 are utilized together, the light utilization efficiency is improved, while preventing an unnecessary light beam from being incident upon the photodetector 29 for detecting magneto-optical signals.

In the case where the polarization direction altering device 38 is a half-wave plate, in order to alter the polarization direction of a light beam, a mechanism for mechanically driving the polarization direction altering device 38 to be in and out of the light path (or for rotating the polarization direction altering device 38 by a predetermined angle) is required. The configuration of the apparatus can be simplified by employing a single driving mechanism for driving both the polarization direction altering device 38 and the polarization state altering device 39.

As described in Example 1, the locations of the objective lenses 4 and 5 can be switched with the polarized beam splitter 22 designed to have a reflectance of about 60 to 80% for an s-polarized light beam and a transmittance of about 95 to 100% for a p-polarized light beam. However, in such a case, the quarter-wave plate 39 is consequently so located as to face the objective lens at a location more remote from the light source with respect to the other objective lens. As a result, the quarter-wave plate 39 is further away from the half-wave plate 38. In view of utilizing the half-wave plate 38 and the quarter-wave plate 39 together, the configuration of FIG. 12, where the two plate 38 and 39 are closer to each other, is more preferable.

Figure 13:
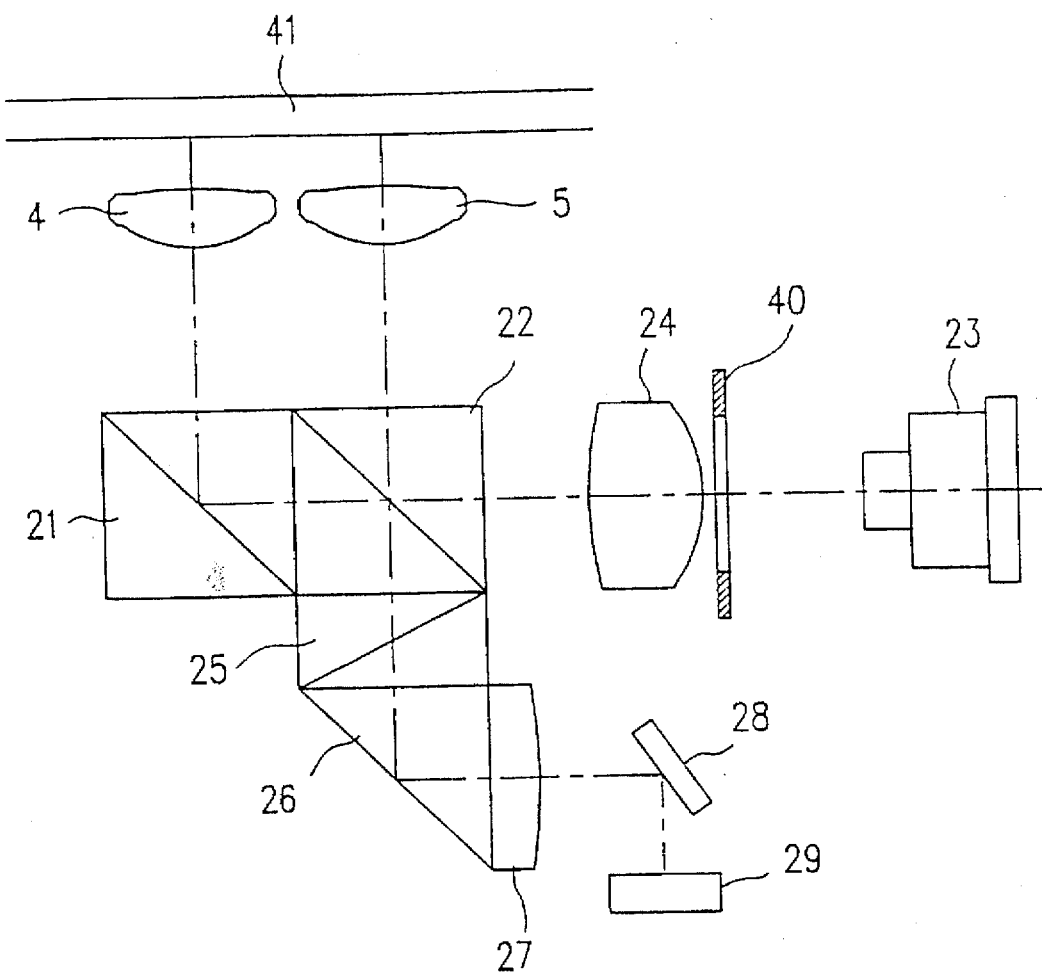
FIG. 13 is a side view illustrating an exemplary arrangement of a photodetector for monitoring a laser power.
Figure 20:
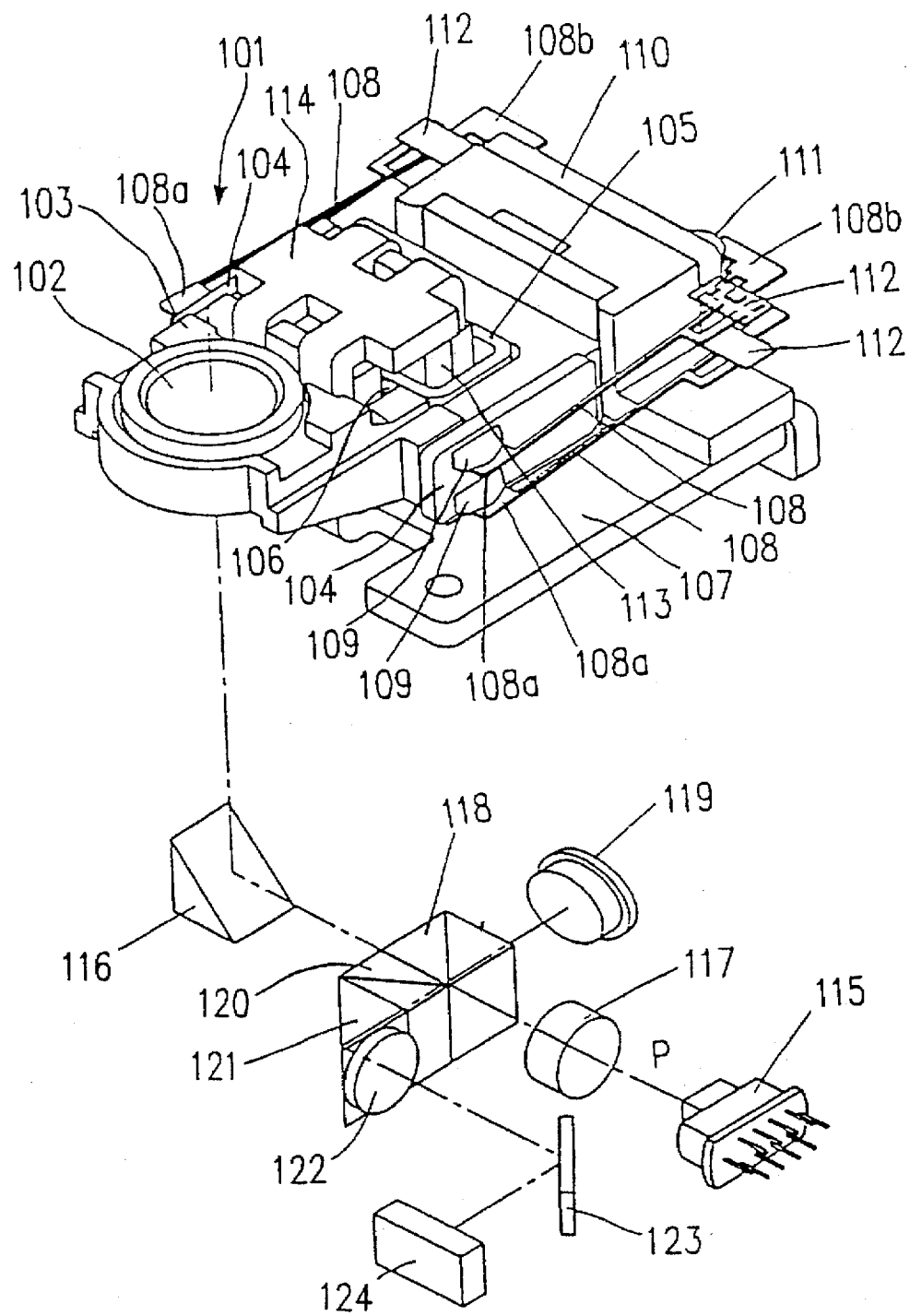
FIG. 20 is an isometric view showing a configuration of main components of a conventional optical pickup.

In the conventional optical pickup shown in FIG. 20, the photodetector 119, which is arranged at such a position that is receives one of two split beams from the polarized beam splitter, is used for monitoring the laser power. However, in the optical pickup of the present invention, a photodetector cannot be arranged at such a position. This is because the optical pickup of the present invention utilizes one of the two split light beams, which are split by the polarized beam splitter, for at least one of recording, reproducing and erasing operations of a magneto-optical disk, and utilizes the other split light beam for at least one of the operations of another optical disk. Therefore, in the optical pickup of the present invention, a monitor pin may be used for monitoring the laser power. Alternatively, as shown in FIG. 13, a member having an aperture 40 for limiting the numerical aperture of the collimator lens 24 can be used as a photodetector for monitoring the laser power of the hologram laser unit 23. The member 40 shown in FIG. 13 is a photodetector having an aperture in the middle. The NA of the collimator lens 24 can be adjusted to a predetermined value by the aperture of the member 40. The portion of the member 40 surrounding the aperture functions as a photodetector. This is a very efficient way to monitor the laser power because signals for monitoring the laser power are obtained by using an unnecessary light beam blocked by the member 40.

EXAMPLE 5

Figure 14:
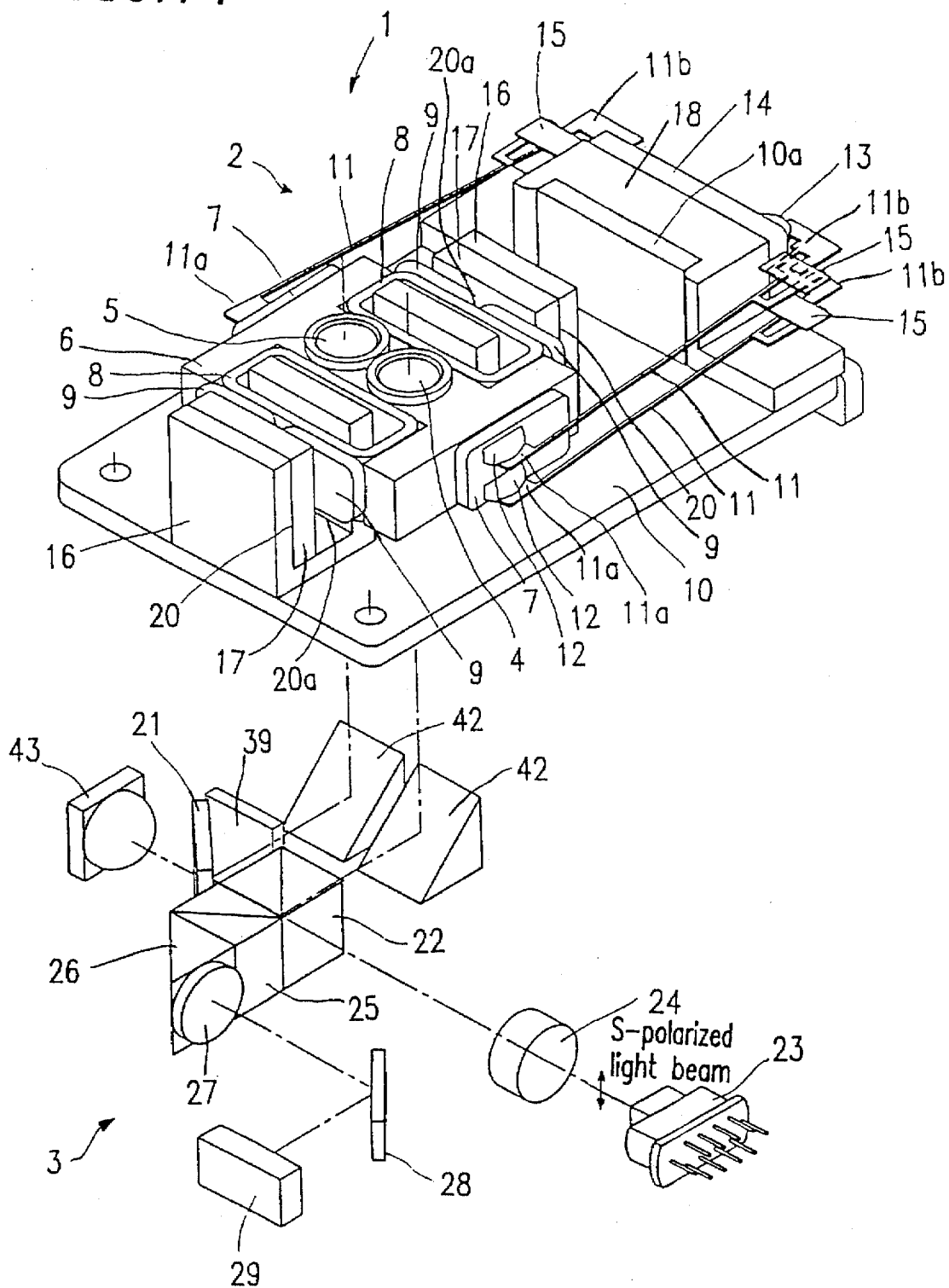
FIG. 14 is an exploded isometric view showing a configuration of an optical pickup according to Example 5 of the present invention.

FIG. 14 is an exploded isometric view showing a configuration of an optical pickup according to Example 5 of the present invention. The objective lens driving device 2 has the same configuration as in Example 1, and therefore will not be further described.

The first difference of Example 5 from Examples 1 to 4 is that the Wollaston prism 25, the reflective mirrors 26 and 28, the spot lens 27 and the photodetector 29 are arranged on the same horizontal plane as that of the other optical elements constituting the optical system 3, such as the polarized beam splitter 22. In addition, the polarized beam splitter 22 is arranged so that a light beam reflected thereby is directed toward a direction parallel to the above-mentioned horizontal plane. Such an arrangement requires additional mirrors 42 directly below the objective lenses 4 and 5 for bending the light paths from the polarized beam splitter 22 to the objective lens 4 and 5. However, since all of the optical elements constituting the optical system 3 are arranged on the same horizontal plane, it is possible to realize a relatively thin optical pickup.

The second difference of Example 5 from Examples 1 to 4 is that, as the mirror 21 which is arranged to receive a light beam transmitted through the polarized beam splitter 22, a half mirror is used for partially reflecting the light beam incident thereon irrespective of its polarization direction, instead of a totally-reflective mirror. Also, a photodetector 43 for monitoring the laser power is located in such a position that the photodetector 43 can receive a light beam transmitted through the mirror 21. In this arrangement, the mirror 21 transmits the portion of light beam incident thereupon regardless of the polarization direction of the light beam, and reflects the remaining portion toward the reflective mirror 42. In this example, the half mirror 21 reflects about 90% of the light beam with the remaining portion (about 10%) of the light beam passing therethrough toward the photodetector 43 for monitoring the laser power.

This arrangement of the half mirror 21 and the photodetector 43 is advantageous in reducing the production cost of the optical pickup. In the arrangement for monitoring the laser power as shown in FIG. 13, the loss of light can be made relatively small. However, the portion surrounding the aperture of the member 40 serves as the photodetector, or the photodetector needs to be disposed on the surrounding portion of the member 40. This increases the size of the entire optical pickup. Moreover, in the arrangement shown in FIG. 13, the photodetector which is commercially available cannot be used due to the shape of the surrounding portion of the member 40, and thus a special photodetector is required. This increases the production cost of the optical pickup.

On the other hand, according to the arrangement of this example, any photodetector on the market can be used as the photodetector 43 for monitoring the laser power. Thus, provision of the photodetector 43 for monitoring the laser power does not increase the production cost of the optical pickup.

In addition, this arrangement of the half mirror 21 and the photodetector 43 is advantageous in reducing the size of the entire optical pickup, because the photodetector 43 can be arranged on the same horizontal plane as that on which other optical elements constituting the optical system 3 are arranged, such as the polarized beam splitter 22 and the Wollaston prism 25.

The third difference of Example 5 from Examples 1 to 4 is that the hologram laser unit 23 emits an s-polarized light beam, instead of a p-polarized light beam. In accordance with this feature, the transmittance for the p-polarized light beam and the reflectance for the s-polarized light beam of the polarized beam splitter 22 are set to be about 95–100% and about 60–80%, respectively, and the objective lens 4, which is designed for the magneto-optical disk, is disposed so as to receive the light beam reflected by the polarized beam splitter 22.

The arrangement in which the objective lens 4 is disposed to receive the reflected light beam from the polarized beam splitter 22 is disadvantageous in improving the recording capacity of the magneto-optical disk. However, in the case where the s-polarized light beam is emitted from the hologram laser unit 23, in order to make the p-polarized light beam incident on the polarized beam splitter 22, a polarization direction altering device as described in Example 2 must be employed. Such addition of the polarization direction altering device makes the optical adjustment in the positional relationship of the optical elements constituting the optical system 3 complicated, and increases the production cost of the optical pickup. To avoid such problems, the arrangement of the objective lens 4 in the present example is advantageous.

The fourth difference of Example 5 from Examples 1 to 4 is that the purpose of providing a polarization state altering device (the quarter-wave plate 39) is different from that in Example 3.

In Example 3, the quarter-wave plate 39 is provided for preventing (when performing at least one of recording, reproducing and erasing operations for a magneto-optical disk) an unnecessary light beam (transmitted through the second objective lens 5 designed for optical disks other than a magneto-optical disk) from being incident upon the photodetector 29 for detecting magneto-optical signals. On the other hand, in Example 5, the quarter-wave plate is provided so that the amount of light of the light beam incident upon the photodetector 29 and the photodiode 31 in the hologram laser unit 23 will be the same regardless of whether recording, reproducing, and erasing operations are performed for a magneto-optical disk using the objective lens 4 or for an optical disk other than a magneto-optical disk using the objective lens 5. Accordingly, the crystal orientation of the quarter-wave plate 39 of Example 5 is different from that of Example 3, and is set to attain this purpose. In particular, the crystal orientation of the quarter-wave plate 39 has a crystal orientation of about 28.4° with respect to the polarization direction of the s-polarized light beam in Example 5.

Here, referring to FIGS. 14, 15A, 15B and 15C, the arrangement of the quarter-wave plate 39 will be described.

In an optical pickup shown in FIG. 14, it is assumed that: the reflectance of the polarized beam splitter 22 for an s-polarized light beam is about 75%; the transmittance thereof is about 23%; the transmittance of the polarized beam splitter 22 for a p-polarized light beam is about 96%; the reflectance of the mirror 21 is about 90%; the transmittance of the quarter-wave plate 39 is about 98%; the ratio of the effective area of the objective lenses 5 and 4 (the objective lens 4 area/the objective lens 4 area) is about 0.85; the reflectance of a type of magneto-optical disk is about 15%; the reflectance of an optical disk other than a magneto-optical disk is about 70%; the reflectance of the mirrors 42 is substantially 100%; and substantially 100% of the light beam emitted by the hologram laser unit 23 is incident upon the polarized beam splitter 22. It is further assumed that: the amount of the light beam which returns to the polarized beam splitter 22 via the objective lens 4 after being reflected by a magneto-optical disk is $P_4$; and the amount of the light beam which returns to the polarized beam splitter 22 via the objective lens 5 after being reflected by an optical disk other than a magneto-optical disk is $P_5$. On such assumptions, the ratio $P_4/P_5$ is expressed as follows:

$$\frac{P_4}{P_5} = \frac{0.75 \times 0.15}{0.23 \times 0.9 \times 0.98 \times 0.85 \times 0.7 \times 0.98 \times 0.9} \approx 1$$

As can be seen from this expression, the light beams return to the polarized beam splitter 22 with the amounts of light thereof being substantially the same.

When a magneto-optical disk reflects the light beam from the objective lens 4, the polarized beam splitter 22 transmits about 23% of the returning light beam toward the photodetector 29 while reflecting about 75% of the light beam toward the photodiode 31 in the hologram laser unit 23. Therefore, in the present example, the polarization state of the light beam, which has been reflected by the optical disk for which the objective lens 5 is designed toward the polarized beam splitter 22, is altered so that the photodetector 29 and the photodiode 31 receive the same ratio of the light beam as that in the case of the magneto-optical disk. To achieve this, the quarter-wave plate 39 is used and the crystal orientation thereof is determined.

Figure 15A:
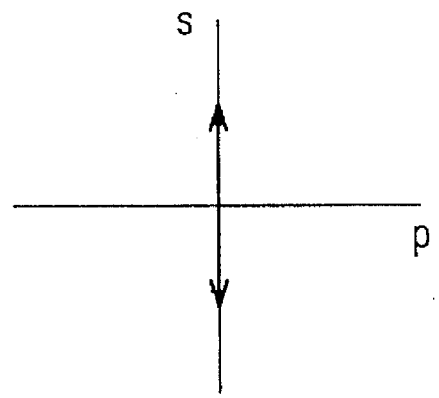
FIGS. 15A to 15C are graphical diagrams for illustrating the operation of a quarter-wave plate, where
Figure 15B:
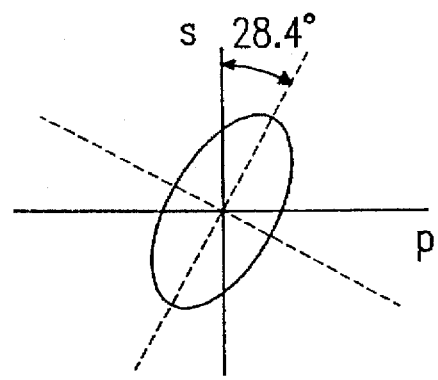
Figure 15C:
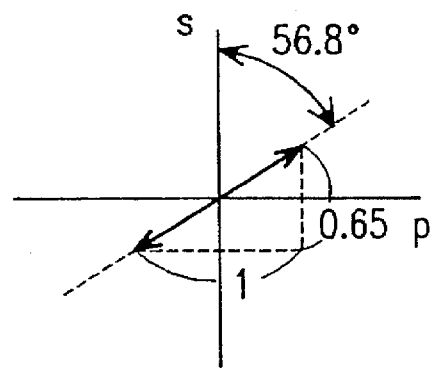

FIGS. 15A to 15C are diagrams for illustrating the operation of the quarter-wave plate 39. It is assumed that the quarter-wave plate 39 has a crystal orientation of about 28.4° with respect to the polarization direction of the s-polarized light beam. Generally, the p-polarized light beam is defined as a linearly polarized light beam whose vibration plane includes the direction in which a polarized beam splitter transmits and reflects light beams, while the s-polarized light beam is a linearly polarized light beam having a polarization direction perpendicular to that of the p-polarized light beam.

FIG. 15A shows the polarization state of the light beam before being incident upon the quarter-wave plate 39. As shown in the figure, the light beam is s-polarized as it is emitted by the hologram laser unit 23. FIG. 15B shows the polarization state of the light beam after passing through the quarter-wave plate 39. As shown in the figure, the polarization state of the light beam is altered to the elliptic polarization with the axis thereof being inclined by about 28.4° with respect to the polarization direction of the s-polarized light beam.

FIG. 15C shows the polarization state of the returning light beam after again passing through the quarter-wave plate 39. The light beam is reflected by the optical disk with the rotational direction of the elliptic polarization thereof being inverted. Thus, the polarization direction of the light beam is further rotated by about 28.4° and, consequently, the light beam becomes a linearly-polarized light beam with the polarization direction thereof being inclined by about 56.8° with respect to the polarization direction of the s-polarized light beam. At this time, the ratio of the amplitude of the s- and p-polarized beam (s:p) is about 0.65:1. The ratio of the light amount of the s- and p-polarized light beam is 0.42:1, which is obtained by raising the amplitude ratio to the second power. This indicates that the light beam returning to the polarized beam splitter 22 contains about 30% (by amount of light) of an s-polarized component and about 70% (by amount of light) of a p-polarized component.

Therefore, when an optical disk other than a magneto-optical disk is used, the amount of light of the returning light beam reflected by the polarized beam splitter 22 toward the photodetector 29 is obtained as follows:

0.3×0.75≈0.23.

The light amount of the light beam passing through the polarized beam splitter 22 toward the photodiode 31 in the hologram laser unit 23 is obtained as follows:

0.7×0.96+0.3×0.23≈0.75.

Thus, the ratio of the light amount of the light beams incident upon the two photodetectors becomes identical to that when a magneto-optical disk is used.

As described above, the light amount of the light beams to be incident upon the two photodetectors can be made substantially the same regardless of the type of the optical disk to be used. Therefore, it is not necessary to adjust the laser power or the gain of the photodetector depending on the type of the optical disk to be used.

In the above description, the crystal orientation of the quarter-wave plate 39 is set to be 28.4° with respect to the polarization direction of the s-polarized light beam. However, in view of an error due to variation in optical elements constituting optical system 3, the crystal orientation of the quarter-wave plate can be made adjustable after being incorporated in an optical pickup.

The ratio of the light amounts of the returning light beams to be incident upon the polarized beam splitter when using a magneto-optical disk and when using an optical disk other than a magneto-optical disk is made to be 1:1. However, the ratio varies as a specification (i.e., the reflectance and the transmittance) of any one of the optical elements of the optical pickup varies. In such a case, the reflectance of the mirror 21 or the like can be adjusted. When it is not possible to make the ratio 1:1, the crystal orientation of the quarter-wave plate 39 can be designed so that at least one of the photodetectors receives a light beam of the same amount of light (so that the gain of at least one of the photodetectors does not need to be switched).

As is apparent from the above description, the photodetector 29 receives the light beam not only in the case of the magneto-optical disk for which the objective lens 4 is designed, but also in the case of the optical disk for which the objective lens 5 is designed. In the latter case, the light beam incident on the photodetector 29 is used for obtaining the RF signal.

In Example 3, when using an optical disk other than a magneto-optical disk, a light beam is prevented from being incident upon the photodetector 29, and an RF signal is obtained based on the light beam incident on the photodiode 31 included in the hologram laser unit 23. However, in Example 3, the light beam incident on the hologram laser unit 23 is directed to the photodiode 31 by diffraction occurring at the holographic optical element 33, thereby reducing the light amount. This reduction in the light amount adversely effects the RF signal detection. Therefore, in Example 5, the RF signal is obtained using the photodetector 29.

On the other hand, it is possible to detect the servo signals by the photodetector 29 in view of the above-mentioned loss of the light beam when being diffracted by the holographic optical element 33 in the hologram laser unit 23. However, detecting the servo signals by the photodetector 29 requires an additional device for detecting the focusing error signal. For example, an additional cylindrical lens is required in the case where the focusing servo signal is to be detected by an astigmatism method. Therefore, the present example employs such a configuration where the RF signals are detected by the photodetector 29 while detecting the servo signals by the photodiode 31.

EXAMPLE 6

Figure 16:
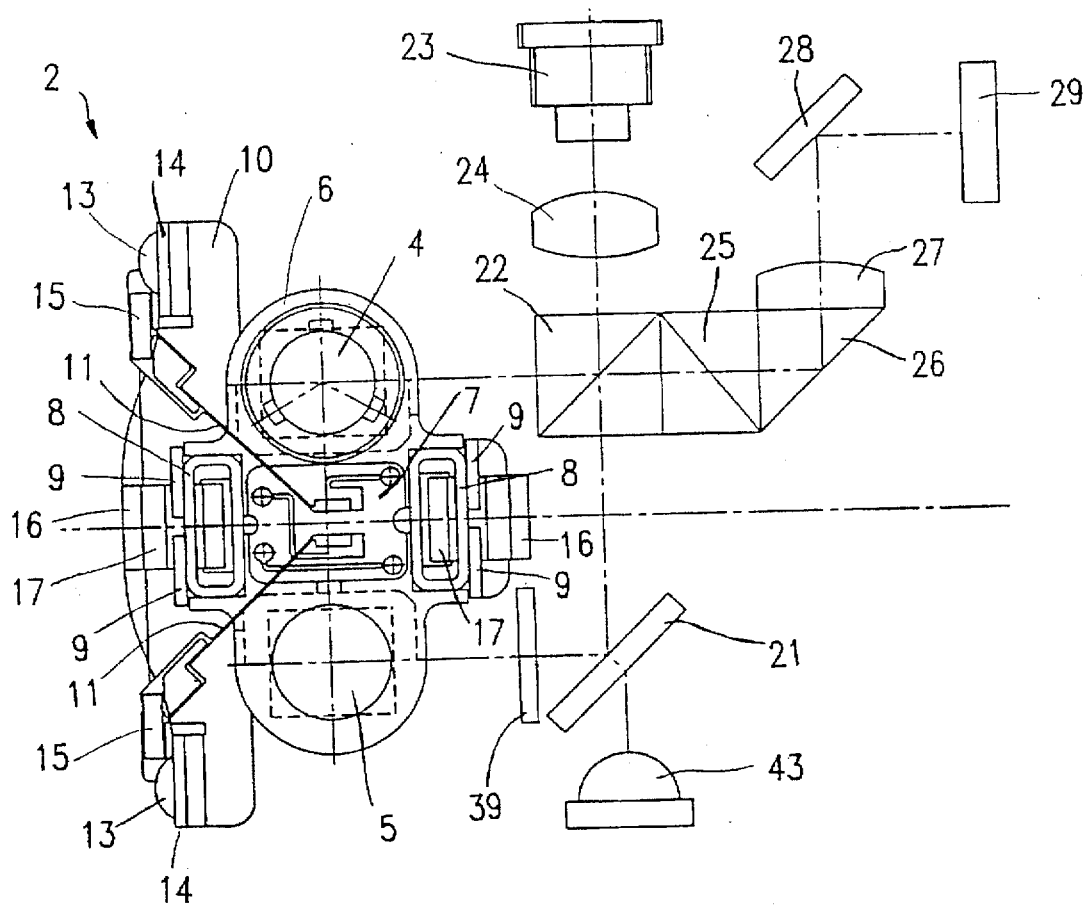
FIG. 16 is a plan view showing a configuration of an optical pickup according to Example 6 of the present invention.

FIG. 16 is a plan view showing a configuration of an optical pickup according to Example 6 of the present invention.

In each of Examples 1 to 5, the two objective lenses of the objective lens driving device 2 are arranged in the tracking direction. However, the present invention is not limited thereto, and it is also applicable as in Example 6 to arrange the two objective lenses in the tangential direction of the disk which is perpendicular to the tracking direction. In such a case, it is preferable in terms of the balance to perform the tracking control operation by rotating the optical pickup about a proximate midpoint between the two objective lenses. According to such a configuration where the two objective lenses are arranged in the tangential direction of the disk, the location of the two objective lenses becomes irrelevant to the potential recording capacity of the disk. Therefore, there is an advantage in such a case as in Example 5 where at least one of recording, reproducing and erasing operations are performed for a magneto-optical disk by using an s-polarized light beam reflected by the polarized beam splitter.

The optical system 3 has the same configuration as in Example 5, and therefore will not be further described. Referring to FIG. 16, the configuration of the objective lens driving device 2 will be briefly described. The movable section of the objective lens driving device 2 includes two objective lenses 4 and 5; the lens holder 6 for accommodating the objective lenses 4 and 5; substrates 7 attached to the upper and lower surfaces of the lens holder 6; and the focusing coil 8 and the tracking coil 9 secured in recesses at both ends of the lens holder 6. Each of the upper and lower surfaces of the substrates 7 is provided with the two elastic bodies 11 for supporting the lens holder 6 in such a manner that the lens holder 6 can move in the focusing direction and in the tracking direction with respect to the base 10. Each set of the two elastic bodies 11 is arranged so as to form a substantial V shape with the crossing point of the two elastic bodies 11 (being extended) in the vicinity of the center of gravity of the movable section. Both ends of each elastic body 11 are fixed to the substrate 7 and the substrate 14. A portion of the focusing coil 8 and a portion of the tracking coil 9 are located in a gap of a magnetic circuit formed between the yoke 16 and the permanent magnet 17. Terminals of the focusing coils 8 and the tracking coils 9 are electrically connected to the substrate 14 via the substrate 7 and the elastic bodies 11.

Due to such a configuration, it is possible to drive the two objective lenses independently in the focusing direction and the tracking direction by applying an electric current through the focusing coils 8 and the tracking coils 9, respectively.

EXAMPLE 7

Figure 17:
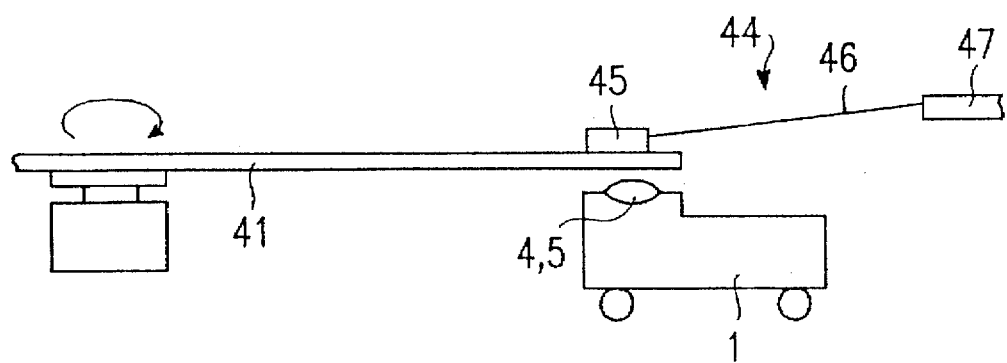
FIG. 17 is a side view showing the positional relationship between a magnetic head and an optical pickup according to Example 7 of the present invention.
Figure 18A:
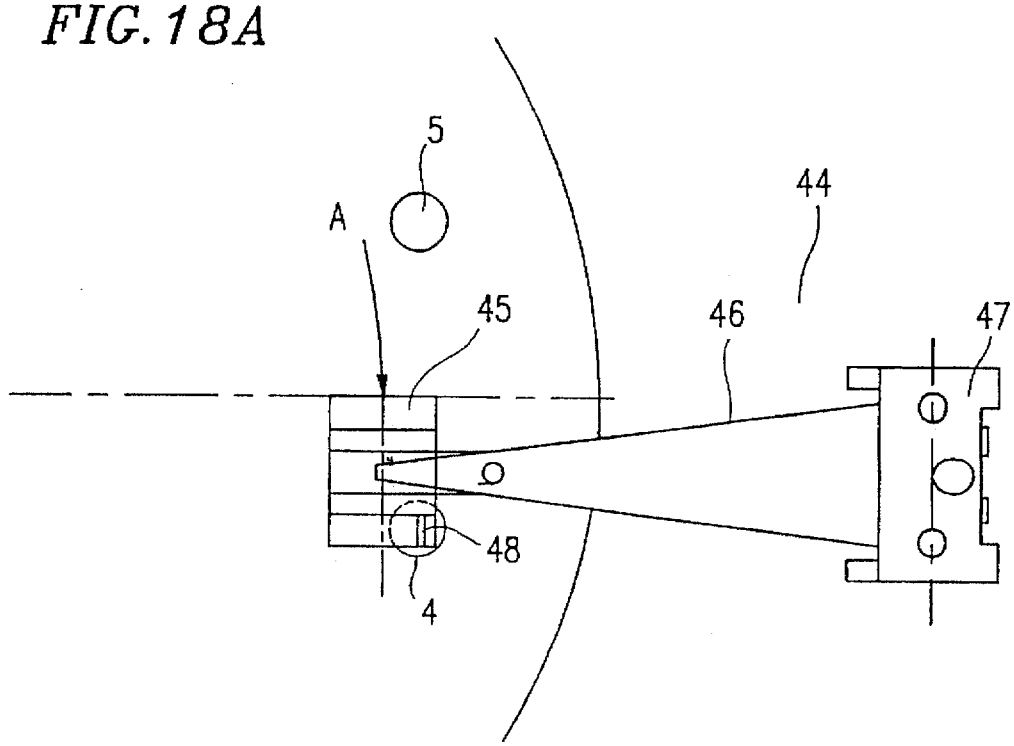
FIGS. 18A and 18B are plan views showing the positional relationship between a magnetic head and two objective lenses according to Example 7 of the present invention.
Figure 18B:
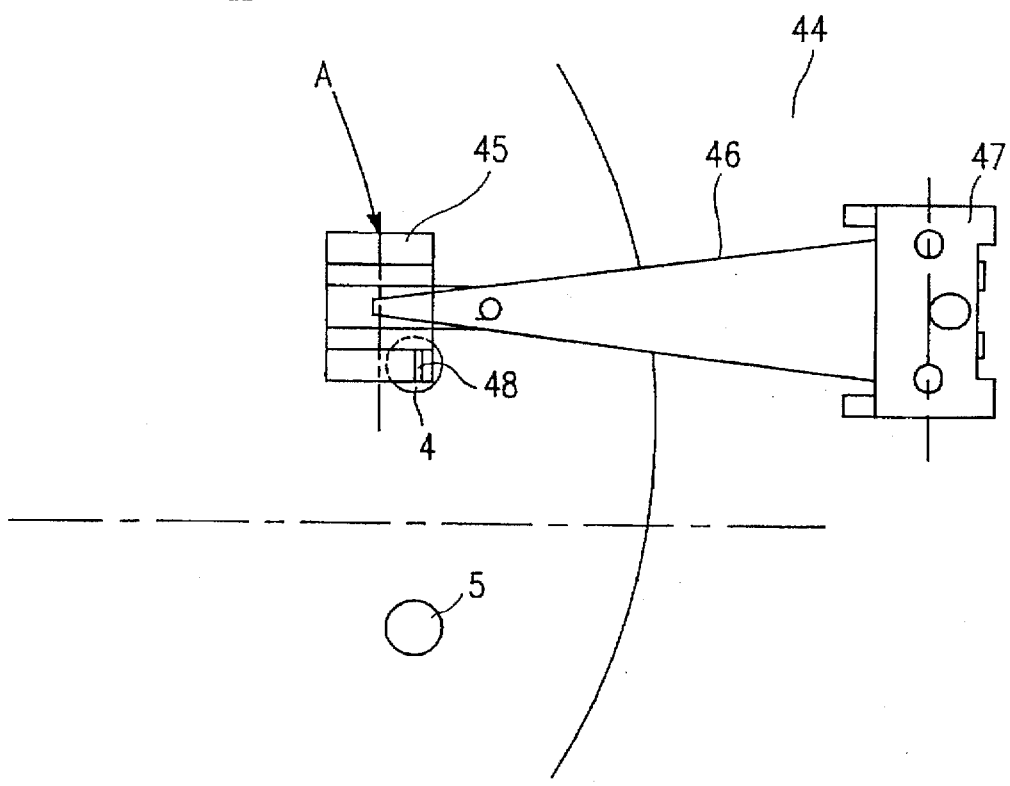
Figure 19:
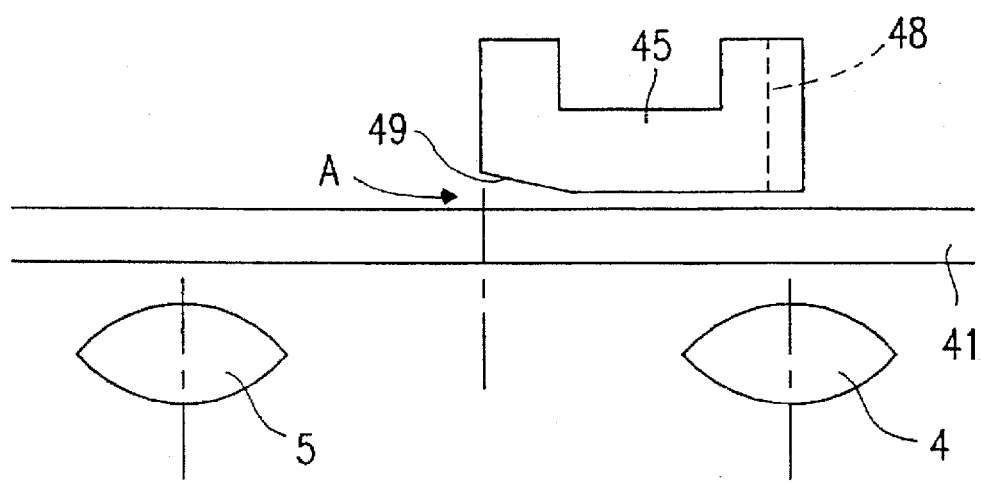
FIG. 19 is a side view showing the positional relationship between a sliding member of a magnetic head and two objective lenses according to Example 7 of the present invention.

Referring to FIGS. 17 to 19, the seventh example of the present invention will be described.

FIGS. 17 to 19 are schematic views for illustrating an optical pickup of this example, where FIG. 17 is a side view showing the positional relationship between a magnetic head 44 and the optical pickup 1; FIGS. 18A and 18B are plan views showing the positional relationship between the magnetic head 44 and the two objective lenses 4 and 5; and FIG. 19 is a side view showing the positional relationship between a sliding member 45 of the magnetic head 44 and the two objective lenses 4 and 5.

The configuration of the objective lens driving device 2 is the same as that in Example 6, and therefore the description thereof will be omitted. As is seen from FIGS. 17 to 19, two objective lens 4 and 5 are arranged side by side in the tangential direction.

The magnetic head 44 includes a sliding member 45, a spring member 46, a supporting member 47 and a core 48. As shown in FIG. 17, the sliding member 45 is lifted up due to an air flow generated by the rotation of an optical disk 41 with the distance between the optical disk 41 and the sliding member 45 being kept constant. The supporting member 47 is typically connected to the optical pickup 1 so that the magnetic head 44 can move integrally with the optical pickup 1 in the radial direction of the optical disk 41.

As shown in FIGS. 18A and 18B, the core 48, which is wound up with a coil for generating a magnetic field, is provided in the sliding member 45 of the magnetic head 44. The core 48 is located with the center thereof substantially corresponding to the optical center of the objective lens 4 for performing at least one of recording and erasing operations for a type of magneto-optical disk. FIGS. 18A and 18B illustrate the case where the optical disk 41 is rotated in a clockwise direction as viewed from the side of the magnetic head 44, thereby generating an air flow in a direction along a peripheral direction of the disk 41 as indicated by an arrow A in FIGS. 18A and 18B. In FIG. 18A, the objective lens 4 is located on the downstream side of the air flow, whereas in FIG. 18B, the objective lens 4 is located on the upstream side of the air flow.

As shown in FIG. 19, the upstream end of the sliding member 45 is tapered to form a tapered section 49 which contributes to the lift up of the sliding member 45 by the air flow. In view of a stable lift up of the sliding member 45, the direction from which the air flows against the tapered section 49 is preferably as perpendicular to the face of the tapered section 49 as possible. However, in such a case as shown in FIG. 18B, the direction from which the air flows against the tapered section 49 is considerably inclined from a direction perpendicular to the face of the tapered section 49. In such a case as shown in FIG. 18A, the tapered section 49 and the objective lens 5 for optical disks other than a magneto-optical disk are arranged substantially in one direction as viewed from the center of the core 48 (and the center of the objective lens 4 for a magneto-optical disk). Therefore, the tapered section 49 can be located a position which is closer to the midpoint between the two objective lenses and to a radius of the disk.

The positional relationship between the tapered section 49 and the core 48 is not limited to that of the present example. However, when the core 48 is provided within the tapered section 49, the lift up of the sliding member 45 will be unstable. Therefore, the tapered section 49 and the core 48 are preferably arranged with a predetermined interval therebetween. Thus, it is possible to arrange the tapered section 49, the core 48, and the objective lenses 4 and 5 so that the tapered section 49 becomes as close to the midpoint between the two objective lenses and to a radius of the optical disk 41 as possible.

The beam splitter of the present invention has two functions: one as a polarized beam splitter for increasing the Kerr rotation angle and another as a prism for splitting a light beam so as to be incident upon the two objective lenses. Thus, the optical pickup can be used for various types of optical disks including a magneto-optical disk while obtaining a satisfactory C/N ratio when detecting magneto-optical signals with a small number of apparatus components.

The objective lens designed for a type of magneto-optical disk can also be used for other types of optical disks having, e.g., a substrate thickness or a refractive index the same as that of the magneto-optical disk. Therefore, the optical pickup of the present invention can be used for three or more types of optical disks.

The polarized beam splitter of the present invention is designed to have a transmittance of about 60 to 80% for a p-polarized light beam and a reflectance of about 95 to 100% for an s-polarized light beam. Therefore, it is possible to increase the Kerr rotation angle when detecting magneto-optical signals, while it is possible to appropriately control the amount of light to be incident upon the second objective lens designed for optical disks other than a magneto-optical disk. In such a case, the first objective lens located at the end of the optical pickup is used for a type of magneto-optical disk. Therefore, an area of a magneto-optical disk near the inner periphery thereof can potentially be utilized, which would be advantageous in increasing the capacity of a magneto-optical disk since it is difficult to increase the information density of a magneto-optical disk compared to a read-only optical disk.

According to the present invention, a polarization direction altering device is provided between a light source and a polarized beam splitter. Therefore, it is possible to eliminate the loss of light by altering the polarization direction of the light beam when the light beam is to be incident upon the second objective lens.

According to the present invention, the half-wave plate can be moved alternately in and out of the light path (alternatively, it can also be rotated by a predetermined angle) so as to alter the polarization direction of the light beam before being incident upon the polarized beam splitter. Therefore, the light beam can efficiently be made incident upon the second objective lens.

According to the present invention, a TN liquid crystal panel is used for altering the polarization direction of the light beam, thereby eliminating the need for other driving mechanisms for that purpose.

According to the present invention, a polarization state altering device is provided between the polarized beam splitter and the second objective lens. Therefore, the polarization direction of the incoming light beam to be incident upon the polarized beam splitter can be made different from that of the returning light beam. Accordingly, when performing write, read and erase operations using the first objective lens, an unnecessary light beam passing through the second objective lens can be prevented from returning to the magneto-optical signal detection system. Moreover, the light beams reflected by two different types of optical disks can be controlled to be incident upon the photodetectors with the light amount thereof being substantially the same. Accordingly, it is not necessary to adjust the laser power or the gain of the photodetector depending on the type of the optical disk to be used.

As a polarization state altering device, the present invention employs a quarter-wave plate having a crystal orientation of about 45° with respect to the polarization direction of the light beam incident thereupon. Therefore, other driving mechanisms and the like for altering the polarization state of the light beam are not necessary, thereby resulting in a small number of apparatus components. Moreover, the polarization direction of the light beam can be altered since the light beam passes through the quarter-wave plate twice via the incoming/returning light paths. Therefore, an unnecessary light beam passing through the second objective lens can be prevented from returning to the magneto-optical signal detection system.

According to the present invention, the polarization direction altering device and the polarization state altering device are utilized together. Therefore, an unnecessary light beam can be prevented from returning to the magneto-optical signal detection system, while a light beam can efficiently be made incident upon the second objective lens.

When using the first objective lens, a polarization state altering device is placed in the light path, whereby an unnecessary light beam can be prevented from returning to the magneto-optical signal detection system. On the other hand, when using the second objective lens, the polarization state altering device is pulled out of the light path, whereby it is possible to efficiently return the light beam reflected by the optical disk to a hologram laser unit. Moreover, a polarization state altering device is located between the second objective lens and the polarized beam splitter. Therefore, the polarization state altering device is relatively close to the polarization direction altering device as compared to the case where the polarization state altering device is located between the first objective lens and the polarized beam splitter. As a result, the two devices can easily be interlocked with each other.

According to the present invention, the half-wave plate serving as a polarization direction altering device and the polarization state altering device are driven by the same driving unit. Therefore, the driving mechanism becomes simple.

As a polarization state altering device, the present invention employs a quarter-wave plate. Therefore, other driving mechanisms and the like for altering the polarization state of the light beam are not necessary, thereby resulting in a small number of apparatus components. Moreover, the crystal orientation of the quarter-wave plate is set so that the light beams reflected by two different types of optical disks are incident upon the photodetectors with the amount of light being substantially the same. Therefore, it is not necessary to adjust the laser power or the gain of the photodetector depending on the type of the optical disk to be used.

According to the present invention, the crystal orientation of the quarter-wave plate is set so that the light beams reflected by two different types of optical disks are incident upon the photodetectors with the amount of light being substantially the same. Therefore, it is not necessary to adjust the laser power or the gain of the photodetector depending on the type of the optical disk to be used.

A tapered section of a sliding member can be located close to the midpoint between the two objective lenses, and to a radius. Therefore, a stable lift up of the sliding member can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical pickup for irradiating a first recording medium and a second recording medium with light, at least one of the substrate thickness and the refractive index of the first recording medium being different from that of the second recording medium, the optical pickup comprising:
   a light source for emitting the light;
   a polarized beam splitter for receiving the light and for transmitting at least a portion of the light while reflecting a remaining portion of the light depending on the polarization direction of the light;
   a first objective lens for focusing the reflected light portion by the polarized beam splitter onto the first recording medium; and
   a second objective lens for focusing the transmitted light portion by the polarized beam splitter onto the second recording medium.

2. An optical pickup according to claim 1, wherein the reflectance and the transmittance of the polarized beam splitter for first linearly polarized light are different from the reflectance and the transmittance of the polarized beam splitter for second linearly polarized light, the polarization direction of the first linearly polarized light being perpendicular to the polarization direction of the second linearly polarized light.

3. An optical pickup according to claim 1,
   wherein the light emitted by the light source is first linearly polarized light; and
   wherein the transmittance of the polarized beam splitter for the first linearly polarized light is in a range of about 60 to 80%, while the reflectance of the polarized beam splitter for second linearly polarized light is about 95% or higher, the first linearly polarized light and the second linearly polarized light having polarization directions perpendicular to each other.

4. An optical pickup according to claim 3, wherein at least one of the first recording medium and the second recording medium is a recording medium other than a magneto-optical recording medium.

5. An optical pickup according to claim 4, wherein one of the first recording medium and the second recording medium is a magneto-optical recording medium.

6. An optical pickup according to claim 5, wherein the first objective lens and the second objective lens are arranged substantially in a radial direction of the first recording medium or the second recording medium.

7. An optical pickup according to claim 5, further comprising a lift-up-type magnetic head for applying a magnetic field to the magneto-optical recording medium,
   wherein the magnetic head includes a core section for generating the magnetic field, and a sliding section for supporting the core section which is lifted up due to an air flow generated by rotation of the magneto-optical recording medium;
   wherein the first objective lens and the second objective lens are arranged substantially in a tangential direction to the first recording medium or the second recording medium; and
   wherein one of the first objective lens and the second objective lens that is designed for the magneto-optical recording medium is so arranged that the center of the optical axis thereof is substantially aligned with the center of the core section of the magnetic head, with the other one of the first objective lens and the second objective lens being located on an upstream side of the air flow with respect to the objective lens designed for the magneto-optical recording medium.

8. An optical pickup according to claim 1, further comprising:
   a photodetector for receiving light reflected by the first recording medium or the second recording medium to output a signal based on the reflected light; and
   a first optical element provided between the light source and the polarized beam splitter for altering the polarization direction of the light,
   wherein light reflected by the recording medium is incident upon the photodetector via the polarized beam splitter.

9. An optical pickup according to claim 8, wherein the first optical element is a half-wave plate.

10. An optical pickup according to claim 8, wherein the first optical element is a liquid crystal panel having a twisted nematic liquid crystal layer.

11. An optical pickup according to claim 8, further comprising a second optical element for altering the polarization state of the light,
    wherein the polarized beam splitter has different reflectances for first and second linearly polarized light which have polarization directions that are perpendicular to each other, and
    wherein the second optical element is provided between the polarized beam splitter and the first objective lens, or between the polarized beam splitter and the second objective lens.

12. An optical pickup according to claim 11,
    wherein the first optical element is a half-wave plate, while the second optical element is a quarter-wave plate, with the crystal orientation of the quarter-wave plate being 45° with respect to the first linearly polarized light and to the second linearly polarized light; and
    wherein the first optical element and the second optical element are movable by a single driving unit.

13. An optical pickup according to claim 11, wherein the second optical element is a quarter-wave plate, with the crystal orientation of the quarter-wave plate being 45° with respect to the first linearly polarized light and to the second linearly polarized light.

14. An optical pickup according to claim 13,
    wherein the reflectance of the polarized beam splitter for the first linearly polarized light is smaller than the reflectance of the polarized beam splitter for the second linearly polarized light;
    wherein the second optical element is movably disposed in or out of the light path between the polarized beam splitter and the second objective lens; and
    wherein, when the second linearly polarized light is to be incident upon the polarized beam splitter, the second optical element is moved out of the light path between the polarized beam splitter and the second objective lens.

15. An optical pickup according to claim 1, further comprising a second optical element for altering the polarization state of the light, wherein the second optical element is provided between the polarized beam splitter and the first objective lens, or between the polarized beam splitter and the second objective lens.

16. An optical pickup according to claim 15, wherein the polarized beam splitter has different reflectances for first linearly polarized light and second linearly polarized light which have polarization directions that are perpendicular to each other, and wherein the second optical element is a quarter-wave plate, with a crystal orientation of the quarter-wave plate being 45° with respect to the first linearly polarized light and to the second linearly polarized light.

17. An optical pickup according to claim 1, further comprising a photodetector for receiving light reflected by the first recording medium or the second recording medium to output a signal based on the reflected light, and a second optical element, wherein the second optical element is a quarter-wave plate, with the crystal orientation of the second optical element being so set that an amount of light incident upon the photodetector after being reflected by the first recording medium is substantially the same as an amount of light incident upon the photodetector after being reflected by the second recording medium.

18. An optical pickup according to claim 17, wherein light reflected by the first recording medium and light reflected by the second recording medium are guided to the photodetector via the polarized beam splitter;

wherein the photodetector includes a first detecting section for receiving a portion of the reflected light reflected by the polarized beam splitter, and a second detecting section for receiving a portion of the reflected light transmitted through the polarized beam splitter; and wherein the crystal orientation of the quarter-wave plate is set so that an amount of light incident upon the first detecting section after being reflected by the first recording medium is substantially the same as an amount of light incident upon the first detecting section after being reflected by the second recording medium, and that an amount of light incident upon the second detecting section after being reflected by the first recording medium is substantially the same as an amount of light incident upon the second detecting section after being reflected by the second recording medium.

* * * * *